United States Patent
Hioka

(10) Patent No.: US 9,500,141 B2
(45) Date of Patent: Nov. 22, 2016

(54) CONTROLLER FOR VARIABLE VALVE MECHANISM

(71) Applicant: Eiichi Hioka, Toyota (JP)

(72) Inventor: Eiichi Hioka, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/126,159

(22) PCT Filed: Apr. 2, 2013

(86) PCT No.: PCT/JP2013/060081
§ 371 (c)(1),
(2) Date: Dec. 13, 2013

(87) PCT Pub. No.: WO2014/162517
PCT Pub. Date: Oct. 9, 2014

(65) Prior Publication Data
US 2016/0061118 A1    Mar. 3, 2016

(51) Int. Cl.
*F02D 13/02* (2006.01)
*F02D 41/00* (2006.01)

(52) U.S. Cl.
CPC ....... *F02D 13/0223* (2013.01); *F02D 13/0261* (2013.01); *F02D 41/0087* (2013.01); *Y02T 10/18* (2013.01)

(58) Field of Classification Search
CPC .................. F02D 41/0087; F02D 17/02; F02D 13/06; F02D 2041/0012; F02D 2041/001; F02D 13/0207; F02D 13/0219; F02D 13/0234; F02D 13/0203; F02D 13/0215; F02D 13/0226; F02D 13/023; F02D 13/0238; F01L 1/3442; F01L 1/344; F01L 1/34
USPC ......... 123/90.15, 90.16, 90.17, 90.18, 198 F, 123/198 DB, 481

See application file for complete search history.

(56) References Cited

U.S. PATENT DOCUMENTS

| | | | |
|---|---|---|---|
| 2008/0257300 A1* | 10/2008 | Lyon ........................ | F02D 13/06 123/198 F |
| 2014/0069376 A1* | 3/2014 | Matthews ........... | F02D 41/0087 123/350 |
| 2016/0146120 A1* | 5/2016 | Kawaguchi ............. | F01L 1/267 123/559.2 |

FOREIGN PATENT DOCUMENTS

| | | |
|---|---|---|
| JP | 2006-322371 | 11/2006 |
| JP | 2009-162068 | 7/2009 |

* cited by examiner

*Primary Examiner* — Sizo Vilakazi
(74) *Attorney, Agent, or Firm* — Finnegan, Henderson, Farabow, Garrett & Dunner, LLP

(57) ABSTRACT

An internal combustion engine includes a plurality of cylinders, intake valves (31) provided respectively in the cylinders, and a variable valve mechanism (600) for changing a valve characteristic of the intake valves (31). A motor (210) drives the variable valve mechanism (600). A motor controller (150) controls the motor (210). The internal combustion engine can be operated in a cylinder deactivation mode for retaining the intake valves (31) of some of the cylinders in a valve closing state. When the internal combustion engine returns from the cylinder deactivation mode, the motor controller (150) executes overlap adjustment processing for controlling the valve characteristic such that valve opening periods of the intake valves (31) are not overlapped between the cylinders.

7 Claims, 14 Drawing Sheets

CONTROLLER FOR VARIABLE VALVE MECHANISM

CROSS-REFERENCE TO RELATED APPLICATIONS

This application is a national phase application of International Application No. PCT/JP2013/060081, filed Apr. 2, 2013, the content of which is incorporated herein by reference.

TECHNICAL FIELD

The present invention relates to a controller for a variable valve mechanism.

BACKGROUND ART

An internal combustion engine has been known that deactivates cylinders by stopping an opening and closing action of intake valves in some of the cylinders and maintaining a valve closing state during an engine operation, that is, performs cylinder deactivation.

When an internal combustion engine returns from a cylinder deactivation mode to an all-cylinder operation mode, torque fluctuation due to a change in the engine output is easily caused.

Therefore, for example, the internal combustion engine described in Patent Document 1 reduces the lift amount of intake valves at the time of returning from the cylinder deactivation mode to decrease the engine output, thereby suppressing generation of the torque fluctuation due to an increase in the engine output when the engine returns from the cylinder deactivation mode to the all-cylinder operation mode.

PRIOR ART DOCUMENT

Patent Document

Patent Document 1: Japanese Laid-Open Patent Publication No. 2006-322371

SUMMARY OF THE INVENTION

Problems that the Invention is to Solve

In the device described in Patent Document 1, an increase in the engine output due to an increase in the activated cylinders by returning from the cylinder deactivation mode is suppressed by reducing the lift amount of the intake valves. However, at the time of returning from the cylinder deactivation mode, torque fluctuation may be also generated due to other factors.

That is, in accordance with returning from the cylinder deactivation mode, the intake valves of the deactivated cylinders, which have been maintained in the valve closing state, restart the opening and closing action with a valve characteristic in correspondence to a required engine output at the time of returning. At this time, in a case where valve opening periods of the intake valves respectively provided in the cylinders are partially overlapped between the cylinders, that is, in a case where an overlap is generated in the valve opening periods of the intake valves between the cylinders by overlapping part of the valve opening periods of the intake valves in the returned cylinders, in which the opening and closing action of the intake valves is restarted, and part of the valve opening periods of the intake valves in the activated cylinders, in which the opening and closing action of the intake valves is performed even during execution of the cylinder deactivation mode, some of intake air flowing into the activated cylinders also flows into the returned cylinders. Therefore, the intake air flowing into the activated cylinders is reduced and the output torque of the activated cylinders is decreased. Although some of the intake air flows into the returned cylinders, the output torque is not generated from the returned cylinders after returning from the cylinder deactivation mode and before combustion of an air-fuel mixture is started. Therefore, immediately after returning from the cylinder deactivation mode and before generation of the output torque from the returned cylinders, the output torque of the internal combustion engine is decreased and the torque fluctuation may be generated.

An objective of the present invention is to provide a controller for a variable valve mechanism capable of properly suppressing torque fluctuation immediately after returning from a cylinder deactivation mode.

Means for Solving the Problems

To achieve the foregoing objective, a controller for a variable valve mechanism is applied to an internal combustion engine including a plurality of cylinders, intake valves provided respectively in the cylinders, and a variable valve mechanism for changing a valve characteristic of the intake valves. The internal combustion engine is capable of switching an operation mode between a cylinder deactivation mode for retaining the intake valves of some of the cylinders in a valve closing state and an all-cylinder operation mode for performing opening and closing actions of the intake valves of all the cylinders. The controller includes a control section for controlling the valve characteristic. The control section is capable of setting, as the valve characteristic at the time of executing the all-cylinder operation mode, a valve characteristic with which an overlap is generated in valve opening periods of the intake valves between the cylinders. When the internal combustion engine returns from the cylinder deactivation mode, the control section is configured to execute overlap adjustment processing for controlling the valve characteristic such that an overlap amount in the valve opening periods of the intake valves between the cylinders becomes smaller than an overlap amount set in the all-cylinder operation mode.

According to the above described configuration, the control section executes the overlap adjustment processing. By execution of the overlap adjustment processing, the overlap amount in the valve opening periods of the intake valves between the cylinders immediately after returning from the cylinder deactivation mode becomes smaller than the overlap amount set in the all-cylinder operation mode. Therefore, immediately after returning from the cylinder deactivation mode, a reduction in intake air to the activated cylinders, in which the opening and closing action of the intake valves is performed even during execution of the cylinder deactivation mode, is suppressed, so that a decrease in output torque in the activated cylinders is suppressed. Thus, torque fluctuation immediately after returning from the cylinder deactivation mode can be properly suppressed.

In the above described controller, the valve characteristic when the overlap adjustment processing is executed is preferably a valve characteristic with which the valve opening periods of the intake valves are not overlapped between the cylinders.

According to the above described configuration, the execution of the overlap adjustment processing eliminates overlap in the valve opening periods of the intake valves between the cylinders immediately after returning from the cylinder deactivation mode. Therefore, immediately after returning from the cylinder deactivation mode, the reduction in the intake air to the activated cylinders, in which the opening and closing action of the intake valves is performed even during the execution of the cylinder deactivation mode, is more effectively suppressed, so that the decrease in the output torque in the activated cylinders is further suppressed. Thus, the torque fluctuation immediately after returning from the cylinder deactivation mode can be more properly suppressed.

In the above described controller, the control section is preferably configured to complete execution of the overlap adjustment processing after air-fuel mixture is combusted in the cylinders that have returned from the cylinder deactivation mode.

When the combustion of air-fuel mixture is started in the cylinders that have returned from the cylinder deactivation mode, the output torque is also generated from the returned cylinders. Therefore, in the above described configuration, after the combustion of air-fuel mixture is started in the cylinders that have returned from the cylinder deactivation mode and also after the output torque is also generated from the returned cylinders, the execution of the overlap adjustment processing is completed. Thus, re-generation of the torque fluctuation due to completion of the execution of the overlap adjustment processing is suppressed. In a case of determining whether air-fuel mixture has been combusted in the cylinders, the determination can be performed in an appropriate mode. For example, the combustion of air-fuel mixture can be determined based on the torque fluctuation in the cylinders that have returned from the cylinder deactivation mode. The combustion of air-fuel mixture can also be determined by detecting engine vibration generated in combustion strokes of the cylinders that have returned from the cylinder deactivation mode by a knocking sensor or the like. The combustion of air-fuel mixture can also be determined based on an elapsed time after returning of the cylinder deactivation mode.

In the above described controller, the variable valve mechanism is preferably a multistage variable valve mechanism for changing the valve characteristic in multiple stages by selecting a valve characteristic from a plurality of valve characteristics set in advance. In such a multistage variable valve mechanism, unlike a continuous variable valve mechanism capable of continuously changing the valve characteristic, the valve characteristic cannot be finely adjusted. Therefore, at the time of returning from the cylinder deactivation mode, an overlap is easily generated in the valve opening periods of the intake valves between the cylinders. Thus, a valve characteristic at the time of executing the overlap adjustment processing is preferably set as one of the valve characteristics set in advance in the multistage variable valve mechanism. In this case, even in the multistage variable valve mechanism incapable of finely adjusting the valve characteristic, the torque fluctuation immediately after returning from the cylinder deactivation mode is suppressed by executing the overlap adjustment processing.

In the above described controller, the multistage variable valve mechanism preferably includes a variable mechanism unit for changing the valve characteristic of the intake valves, a control shaft for activating the variable mechanism unit, a cam for moving the control shaft in the axial direction, and an electric motor for turning the cam. Also, a cam surface of the cam preferably has a section in which an axial displacement amount of the control shaft is changed, and a plurality of sections in which the displacement amount is constant.

The above described internal combustion engine preferably includes a forced induction device for supercharging intake air by utilizing exhaust gas.

In the internal combustion engine including such a forced induction device, a supercharging pressure at the time of executing the cylinder deactivation mode is ensured by an exhaust pressure of the activated cylinders, in which the opening and closing action of the intake valves is performed even during the execution of the cylinder deactivation mode. Therefore, when the reduction in the intake air to the activated cylinders is generated at the time of returning from the cylinder deactivation mode, the exhaust pressure of the activated cylinders is decreased and the supercharging pressure is also decreased. Thus, in an internal combustion engine including a forced induction device, in comparison to an internal combustion engine including no forced induction device, a decrease amount of the output torque when the intake air to the activated cylinders is reduced is further increased, so that the above described torque fluctuation also becomes significant. In this respect, in the above described configuration, the reduction in the intake air to the activated cylinders immediately after returning from the cylinder deactivation mode is suppressed by performing the above described overlap adjustment processing. Therefore, the generation of the torque fluctuation due to a decrease in the supercharging pressure immediately after returning from the cylinder deactivation mode is suppressed.

The above described internal combustion engine preferably includes a return passage for returning some of the exhaust gas to the intake air.

In the internal combustion engine in which external EGR is returned into the cylinders, at the time of returning from the cylinder deactivation mode, when some of the intake air flowing into the activated cylinders also flows into the returned cylinders, which have returned from the cylinder deactivation mode, some of the external EGR flowing into the activated cylinders also flows into the returned cylinders. Therefore, an external EGR amount flowing into the activated cylinders is changed and a combustion state of the activated cylinders is changed, so that the torque fluctuation may be also generated because of it. In this respect, in the above described configuration, the reduction in the intake air to the activated cylinders immediately after returning from the cylinder deactivation mode is suppressed by performing the above described overlap adjustment processing. Thus, a change in the external EGR amount flowing into the activated cylinders can also be suppressed. Therefore, immediately after returning from the cylinder deactivation mode, the generation of the torque fluctuation due to the change in the external EGR amount flowing into the cylinders is suppressed.

MODES FOR CARRYING OUT THE INVENTION

Hereinafter, a controller for a variable valve mechanism according to one embodiment will now be described with reference to FIGS. 1 to 10. The controller is applied to an inline four engine.

Figure 1:
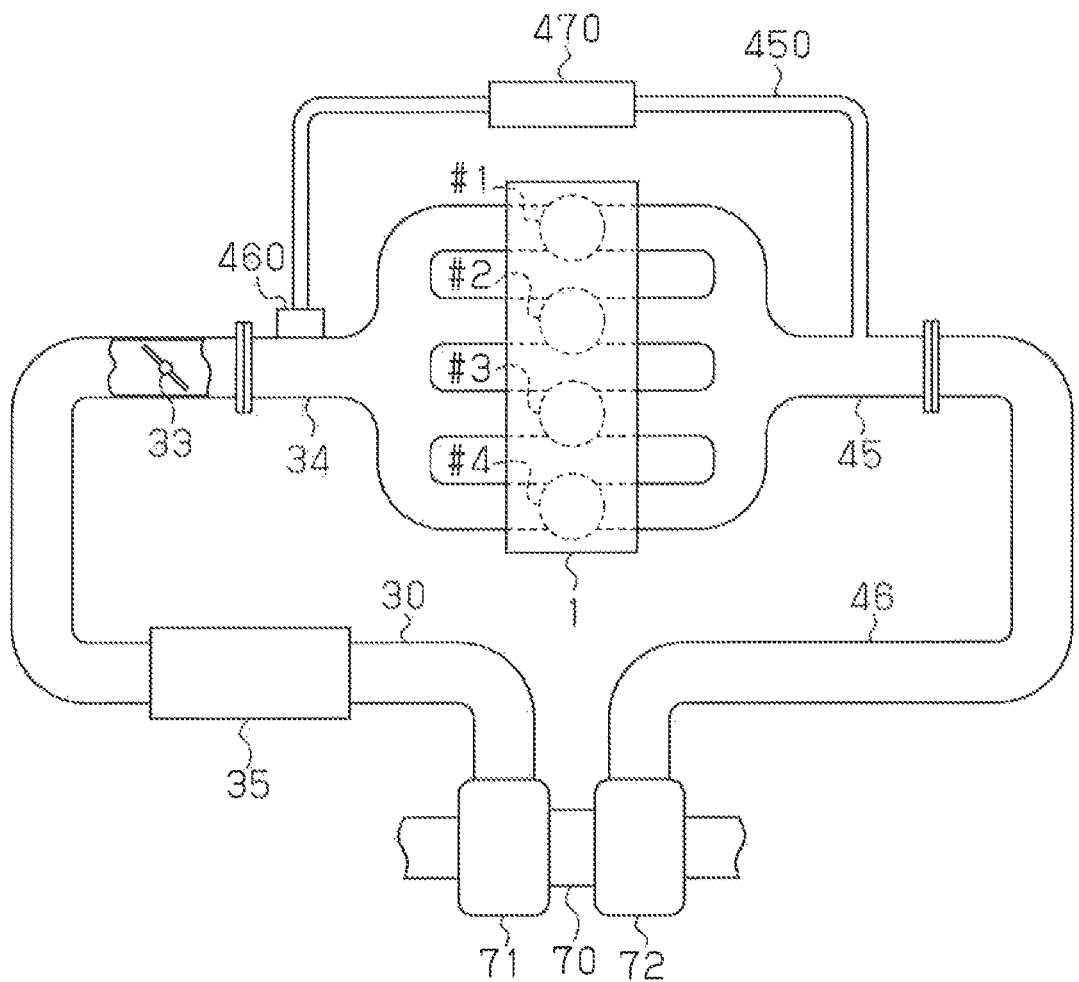
FIG. 1 is a schematic view showing the entire configuration of an internal combustion engine to which one embodiment of a controller for a variable valve mechanism is applied.

As shown in FIG. 1, an engine 1 has four cylinders including a first cylinder #1, a second cylinder #2, a third cylinder #3, and a fourth cylinder #4, which are provided in series.

The engine 1 has fuel injection valves for injecting fuel to the cylinders. An intake manifold 34 for admitting intake air to the cylinders and an exhaust manifold 45 for discharging exhaust gas from the cylinders are connected to the engine 1.

The intake manifold 34 is connected to an intake passage 30. A throttle valve 33 for adjusting an intake air amount is provided in the intake passage 30.

The exhaust manifold 45 is connected to an exhaust gas passage 46.

The engine 1 has a turbocharger 70, which is a forced induction device for supercharging intake air by utilizing the exhaust gas. A compressor housing 71, which accommodates a compressor of the turbocharger 70, is connected to a middle part of the intake passage 30 at an upstream section of the throttle valve 33. In the intake passage 30 between the compressor housing 71 and the throttle valve 33, an intercooler 35 for cooling the intake air the temperature of which has been increased by supercharging of the turbocharger 70 is provided. A turbine housing 72, which accommodates a turbine of the turbocharger 70, is connected to a middle part of the exhaust gas passage 46.

The engine 1 has an exhaust gas recirculation device (hereinafter, referred to as EGR device). The exhaust gas recirculation device is provided with a return passage for returning some of the exhaust gas to the intake air as external EGR. More specifically, as the return passage, an EGR passage 450 for providing communication between the intake manifold 34 and the exhaust manifold 45 is provided. The EGR device is also provided with an EGR cooler 470 provided in a middle part of the EGR passage 450, an EGR valve 460 for adjusting an amount of the external EGR returned to the intake air, and the like. At the time of a low load operation of the engine 1, a required intake air amount is small, and a relatively great amount of the external EGR can be introduced into the cylinders. Thus, at the time of a low load operation, the amount of the external EGR returned to the intake air is increased in comparison to the time of a high load operation.

Figure 2:
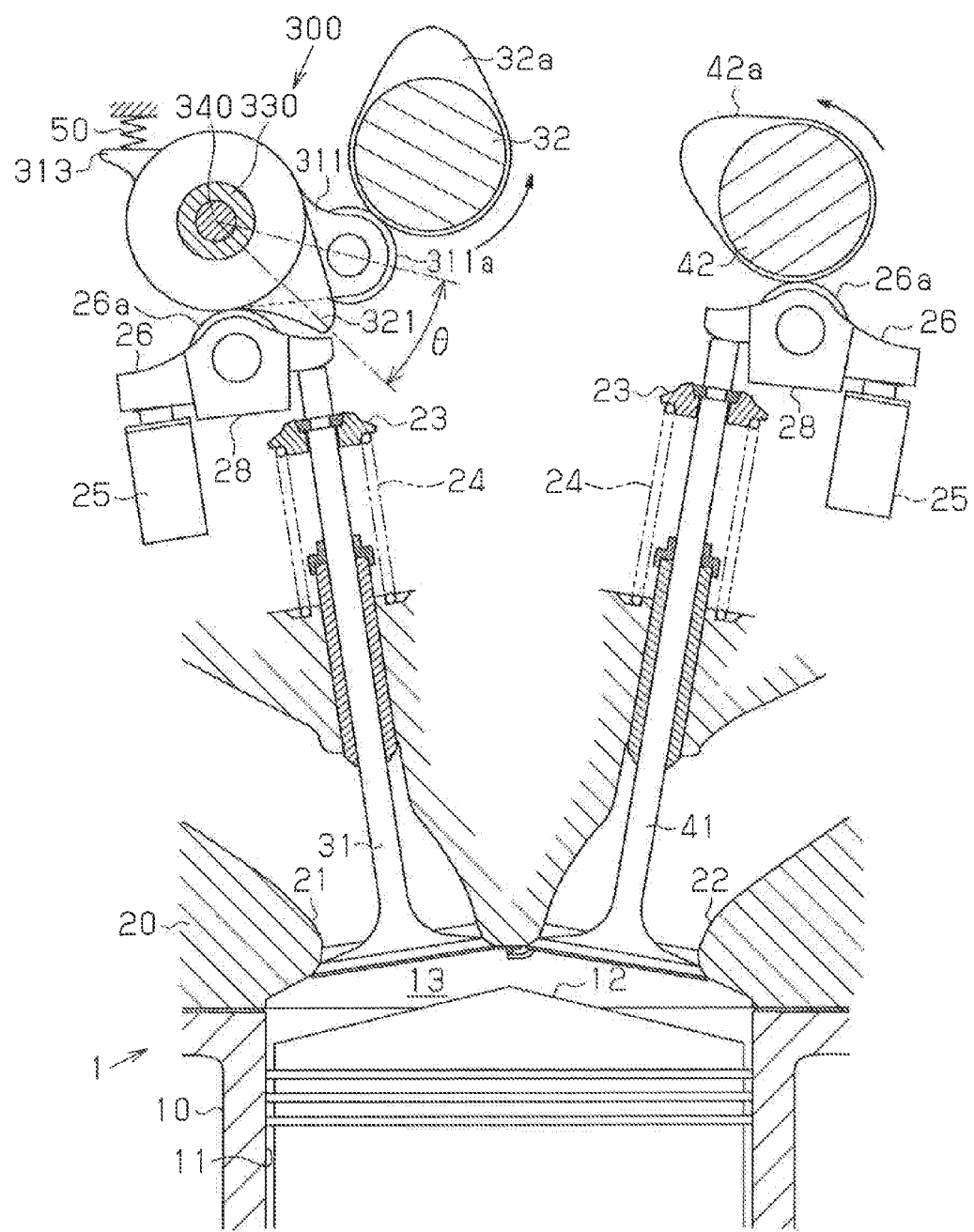
FIG. 2 is a cross-sectional view showing a structure around a cylinder head of the internal combustion engine in the same embodiment.

As shown in FIG. 2, the engine 1 is provided with a cylinder block 10, and a cylinder head 20 arranged on the upper side of the cylinder block 10.

FIG. 2 shows a cylindrical cylinder bore 11 corresponding to one of the cylinders formed inside the cylinder block 10. Each cylinder bore 11 slidably accommodates a piston 12. The cylinder head 20 is assembled to an upper part of the cylinder block 10, and a combustion chamber 13 is defined by the inner circumferential surface of the cylinder bore 11, the upper surface of the piston 12, and the lower surface of the cylinder head 20.

In the cylinder head 20, pairs of intake ports 21 and pairs of exhaust ports 22 each communicating with a combustion chamber 13 are formed. In each intake port 21, an intake valve 31 for providing and blocking communication between the corresponding combustion chamber 13 and the intake port 21 is provided. In each exhaust port 22, an exhaust valve 41 for providing and blocking communication between the corresponding combustion chamber 13 and the exhaust port 22 is provided. The valves 31, 41 are each urged in the valve closing direction by a valve spring 24.

Also, inside the cylinder head 20, lash adjusters 25 are provided in correspondence to the valves 31, 41. Rocker arms 26 are provided between the lash adjusters 25 and the valves 31, 41. One end of each rocker arm 26 is supported by a lash adjuster 25, and the other end is abutted against an end of a valve 31 or 41.

Further, in the cylinder head 20, an intake camshaft 32 for driving the intake valves 31 and an exhaust camshaft 42 for driving the exhaust valves 41 are rotationally supported.

Intake cams 32a are formed in the intake camshaft 32, and exhaust cams 42a are formed in the exhaust camshaft 42.

The outer circumferential surface of each exhaust cam 42a is abutted against a roller 26a of a rocker arm 26 abutted against an exhaust valve 41. When the exhaust camshaft 42 is rotated and the exhaust cam 42a presses the roller 26a of the rocker arm 26, the rocker arm 26 of the exhaust valve 41 oscillates, taking a part supported by the lash adjuster 25 as a support point. By the oscillation of the rocker arm 26, an opening and closing action of the exhaust valve 41 is performed.

Between each pair of rocker arms 26 abutted against intake valves 31 and the corresponding intake cam 32a, a variable mechanism unit 300 for changing the valve characteristic of the intake valves 31 is provided. Each variable mechanism unit 300 corresponds to one of the cylinders. The variable mechanism units 300 form part of a variable valve mechanism 600, and each have input arms 311 and output arms 321. The input arms 311 and the output arms 321 are supported to oscillate about a support pipe 330 fixed to the cylinder head 20. The corresponding rocker arms 26 are urged toward the output arms 321 by the urging force of the valve springs 24, and the rollers 26a provided in an intermediate part of the rocker arms 26 are abutted against the outer circumferential surfaces of the output arms 321.

A projection 313 is provided on the outer circumferential surface of each variable mechanism unit 300, and the urging force of a spring 50 fixed in the cylinder head 20 is applied to the projection 313. By the urging force of the spring 50, a roller 311a provided at the distal ends of the input arms 311 is abutted against the outer circumferential surface of the corresponding intake cam 32a. When the intake camshaft 32 is rotated, each variable mechanism unit 300 oscillates about the support pipe 330 by an action of the corresponding intake cam 32a. When the rollers 26a of the rocker arms 26 are pressed by the output arms 321, the rocker arms 26 of the intake valves 31 oscillate with parts supported by the lash adjusters 25 serving support points. By the oscillation of the rocker arms 26, the opening and closing action of the intake valves 31 is performed.

Each support pipe 330 receives a control shaft 340 movable along the axial direction of the support pipe 330. By displacing the control shaft 340 in the axial direction, the variable mechanism unit 300 changes the relative phase difference between the input arms 311 and the output arms 321 about the support pipe 330, that is, an angle θ shown in FIG. 2.

The engine 1 is formed to be operable in an all-cylinder operation mode for activating all the cylinders by performing the opening and closing action of the intake valves 31 of all the cylinders, and in addition, in a cylinder deactivation mode for achieving fuel efficiency improvement in a low load region and the like by deactivating some of the cylinders and activating only the remaining cylinders.

Such a cylinder deactivation mode is realized by, in some of the cylinders of the engine 1, stopping both fuel injection and ignition of air-fuel mixture, stopping the opening and closing action of the intake valves 31 and the exhaust valves 41, and retaining both the valves 31, 41 in a valve closing state. Returning from the cylinder deactivation mode to the all-cylinder operation mode is performed by restarting the opening and closing action of the intake valves 31 and the exhaust valves 41, the fuel injection, and the ignition of air-fuel mixture in the cylinders that have been deactivated.

The opening and closing of the intake valve 31 and the exhaust valve 41 is stopped by valve stopping mechanisms 23 respectively provided in the rocker arms 26 for opening and closing the intake valves 31 and the rocker arms 26 for opening and closing the exhaust valves 41. The engine 1 is an inline four engine, and air-fuel mixture is ignited from the first cylinder #1, the third cylinder #3, the fourth cylinder #4, and the second cylinder #2 in order. In the present embodiment, the third cylinder #3 and the second cylinder #2 are cylinders that are deactivated in the cylinder deactivation mode, that is, deactivated cylinders, and the valve stopping mechanisms 28 are provided only in those deactivated cylinders.

At the time of activating the valve stopping mechanisms 28, the rollers 26a of the rocker arms 26 are brought into a state in which the rollers 26a are movable in the above described pressing direction relative to the rocker arms 26. At the time of not activating the valve stopping mechanisms 28, such relative movement is restricted. In this manner, at the time of not activating the valve stopping mechanisms 28, relative movement of the rollers 26a with respect to the rocker arms 26 is restricted. When the rollers 26a are pressed by the output arms 321 and the exhaust cams 42a, the rocker arms 26 of the intake valve 31 and the exhaust valves 41 oscillate as described above, and the opening and closing action of the intake valves 31 and the exhaust valves 41 is performed. At the time of activating the valve stopping mechanisms 28, the rollers 26a are moved relative to the rocker arms 26. Therefore, when the rollers 26a are pressed by the output arms 321 and the exhaust cams 42a, the rollers 26a are moved relative to the rocker arms 26 such that the rollers 26a strike at the air, so that oscillation of the rocker arms 26 is stopped. Thus, the opening and closing action of the intake valves 31 in accordance with rotation of the intake cams 32a is stopped, and the intake valves 31 are retained in the valve closing state by the urging force of the valve springs 24. The opening and closing action of the exhaust valves 41 in accordance with rotation of the exhaust cams 42a is stopped, and the exhaust valves 41 are also retained in the valve closing state by the urging force of the valve springs 24.

Next, with reference to FIG. 3, the configuration of the variable mechanism unit 300 will be described.

Figure 3:
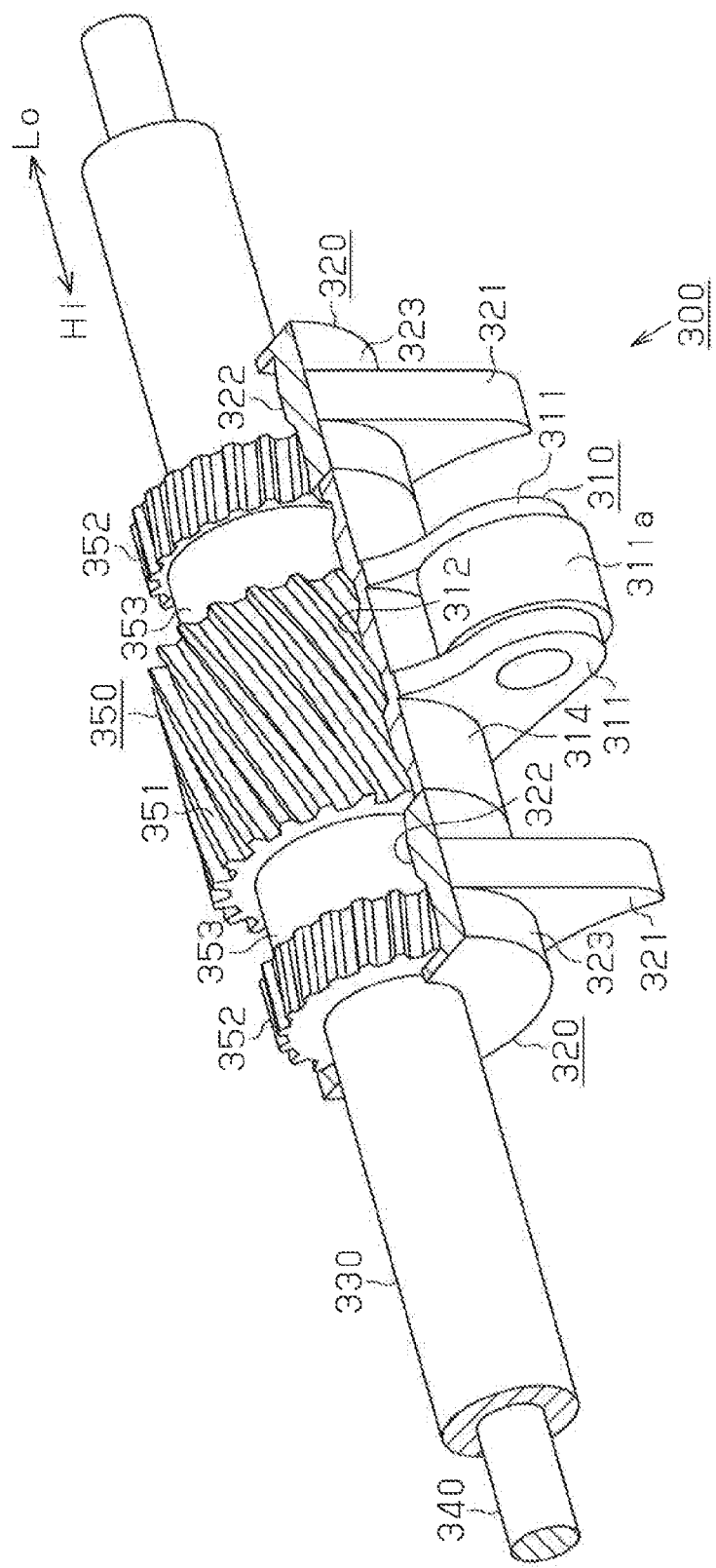
FIG. 3 is a perspective view, with a part cut away, showing a variable mechanism unit in the same embodiment.

As shown in FIG. 3, the variable mechanism unit 300 includes output units 320 arranged on both sides of an input unit 310.

Housings 314, 323 of the input unit 310 and the output units 320 are respectively formed into a hollow cylindrical shape, and the support pipe 330 is inserted inside the housings 314, 323.

A helical spline 312 is formed on the inner circumference of the housing 314 of the input unit 310. The leading edges of helical splines 322, are opposite to those of the helical spline 312 of the input unit 310, are formed on the inner circumferences of the housings 323 of the output units 320.

A slider gear 350 is arranged in a series of internal spaces formed by the housings 314, 323 of the input unit 310 and the two output units 320. The slider gear 350 is formed into a hollow cylindrical shape and arranged on the outer circumferential surface of the support pipe 330 to reciprocate in the axial direction of the support pipe 330 and to rotate about the axis of the support pipe 330.

A helical spline 351 to be meshed with the helical spline 312 of the input unit 310 is formed on the outer circumferential surface of an axially center part of the slider gear 350. Helical splines 352 to be meshed with the helical splines 322 of the output units 320 are formed on the outer circumferential surfaces of both axial ends of the slider gear 350.

The control shaft 340, which is movable in the axial direction of the support pipe 330, is provided inside the support pipe 330. The control shaft 340 and the slider gear 350 are engaged by pins. The slider gear 350 is turnable with respect to the support pipe 330, and the slider gear 350 is also moved in the axial direction in conformity with axial movement of the control shaft 340.

In the variable mechanism unit 300 formed in the above described manner, when the control shaft 340 is moved in the axial direction, the slider gear 350 is also moved in the axial direction in conjunction with the movement of the control shaft 340. The helical splines 351, 352 formed on the outer circumferential surface of the slider gear 350 have different leading edge forming directions from each other, and are respectively meshed with the helical splines 312, 322 formed on the inner circumferential surfaces of the input unit 310 and the output units 320. Therefore, when the slider gear 350 is moved in the axial direction, the input unit 310 and the output units 320 are turned in the directions opposite to each other. As a result, the relative phase difference between the input arms 311 and the output arms 321 is changed, so that a maximum lift amount and a valve opening period, which are valve characteristics of the intake valve 31, are changed. Specifically, when the control shaft 340 is moved in the arrow Hi direction shown in FIG. 3, the slider gear 350 is moved in the arrow Hi direction together with the control shaft 340. Accordingly, the relative phase difference between the input arms 311 and the output arms 321, that is, the angle θ shown in FIG. 2 is increased, the maximum lift amount VL and the valve opening period INCAM of the intake valve 31 are increased, and the intake air amount is increased. When the control shaft 340 is moved in the arrow Lo direction shown in FIG. 3, the slider gear 350 is moved in the arrow Lo direction together with the control shaft 340 and accordingly, the relative phase difference between the input arms 311 and the output arms 321, that is, the angle θ shown in FIG. 2 is decreased. Thereby, the maximum lift amount VL and the valve opening period INCAM of the intake valve 31 are decreased, and the intake air amount is reduced.

Next, the configuration of a drive unit for moving the control shaft 340 of the variable valve mechanism 600 in the axial direction will be described.

Figure 4:
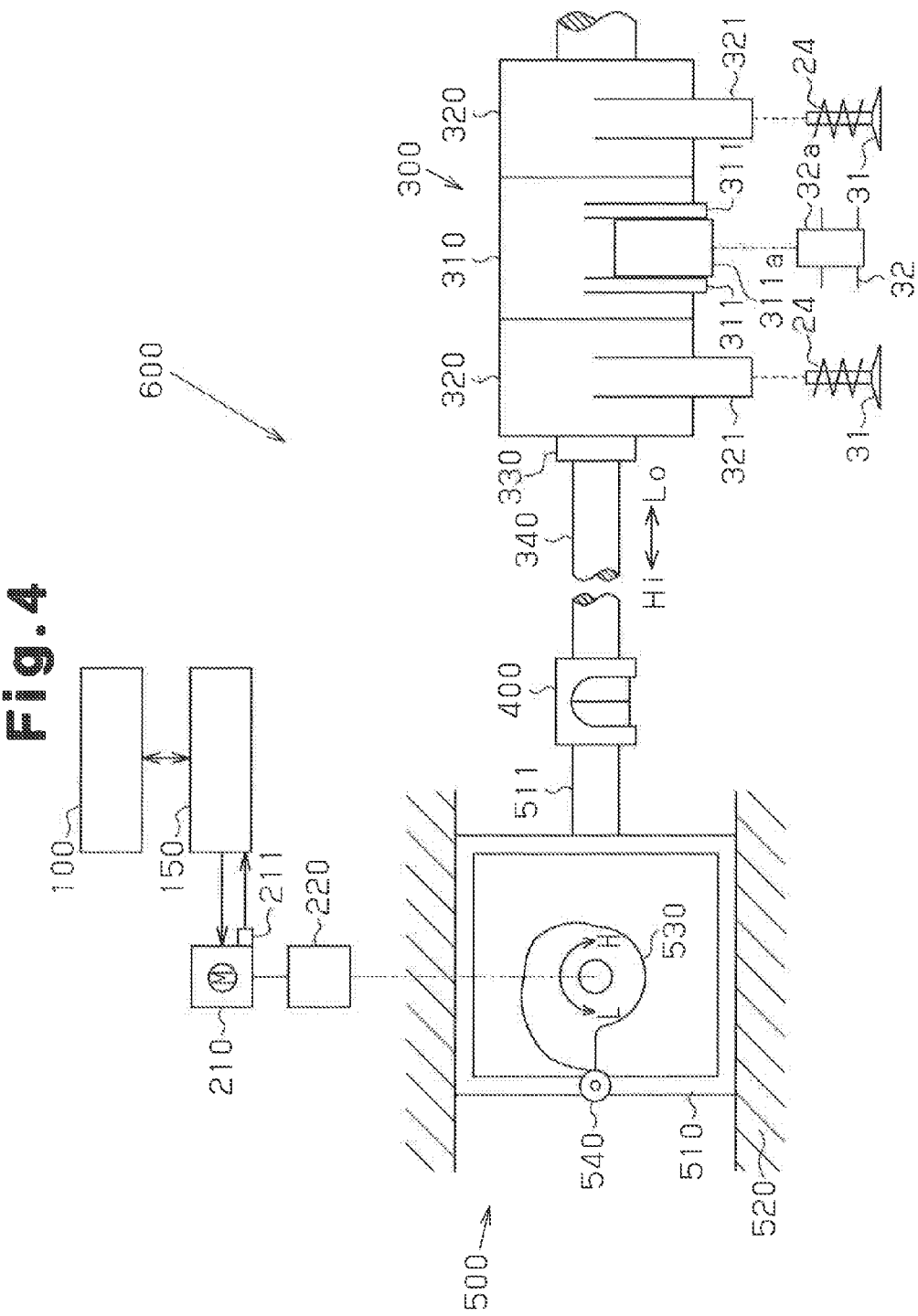
FIG. 4 is a schematic view of a multistage variable valve mechanism in the same embodiment.

As shown in FIG. 4, the drive unit of the variable valve mechanism 600 is provided with an electric motor 210, a reduction mechanism 220 for reducing rotational speed of the motor 210, and a conversion mechanism 500 for converting rotation motion of the reduction mechanism 220 into linear motion of the control shaft. The motor 210 has a rotational angle sensor 211 for detecting a rotational angle of the motor 210.

The reduction mechanism 220 is provided with a plurality of gears and the like. An input shaft of the reduction mechanism 220 is connected to an output shaft of the motor 210, and an output shaft of the reduction mechanism 220 is connected to a cam 530 provided in the conversion mechanism 500.

The conversion mechanism 500 is provided with a holder 510, and a guide 520 for guiding movement of the holder 510. The holder 510 is moved forward and backward along the guide 520. A connection shaft 511 extending toward the control shaft 340 is attached to the holder 510, and an end of the connection shaft 511 is coupled to an end of the control shaft 340 on the side corresponding to the connection shaft 511 by a coupling member 400.

In the holder 510, the cam 530, which is turned by the output shaft of the reduction mechanism 220, is arranged. A roller 540 in contact with a cam surface of the cam 530 is rotationally attached to the holder 510.

When the cam 530 is turned, the holder 510 serving as a follower, or a member to which motion of the cam 530 is transmitted, is moved along the guide 520. By the movement of the holder 510, the control shaft 340 is displaced in the axial direction, in which the center axis of the control shaft 340 extends.

A motor controller 150 serving as a control section for controlling the drive of the motor 210 is connected to the motor 210. The rotational angle of the motor 210 is controlled in correspondence to a drive signal from the motor controller 150. The motor controller 150 is connected to an engine controller 100 for controlling an operation state of the engine 1.

An accelerator operation amount detected by an accelerator operation amount sensor, a crank angle detected by a crank angle sensor, and the like are input to the engine controller 100. The engine controller 100 calculates a required intake air amount in correspondence to a required engine output, for example, based on the engine rotation speed NE calculated from the crank angle, the accelerator operation amount ACCP, or the like, and calculates the maximum lift amount of the intake valve 31 with which the required intake air amount is obtained. The calculated maximum lift amount is set as a target lift amount VLp. When the target lift amount VLp is set in this manner, the motor controller 150 calculates a rotational phase of the cam 530 corresponding to the target lift amount VLp, and controls the rotational angle of the motor 210 to have the calculated rotational phase.

The motor controller 150 calculates the rotational phase of the cam 530 from the rotational angle of the motor 210 detected by the rotational angle sensor 211, and calculates the current value of the maximum lift amount VL from the calculated rotational phase. The motor controller 150 sends the calculated current value of the maximum lift amount VL to the engine controller 100.

Next, the cam 530 for displacing the control shaft 340 will be described.

Figure 5:
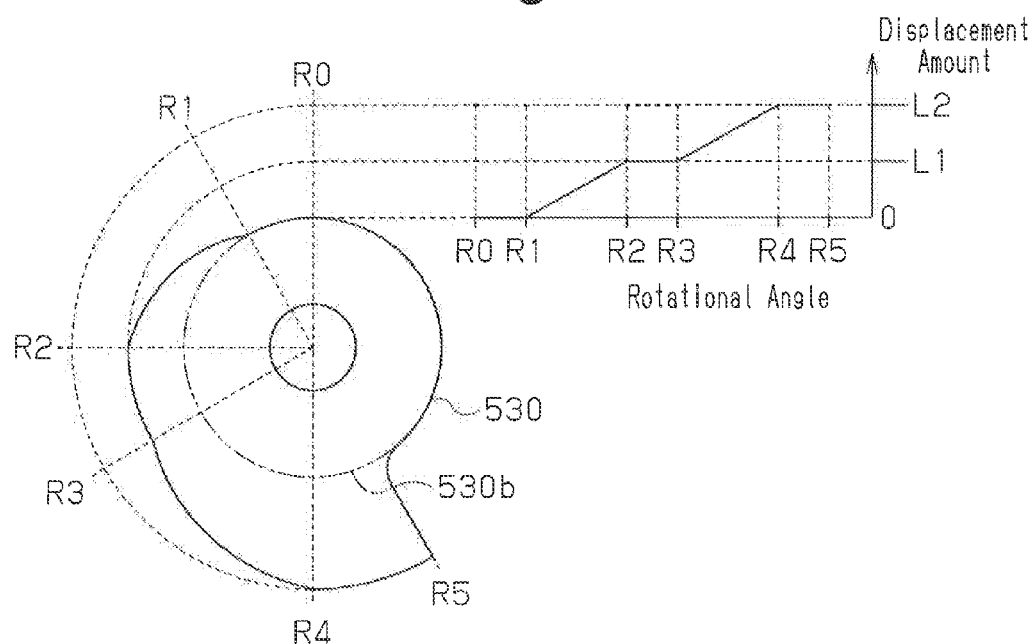
FIG. 5 is a view showing a profile of a cam provided in the multistage variable valve mechanism.

As shown in FIG. 5, the cam surface of the cam 530 is provided with change sections, in which the displacement amount of the control shaft 340 is linearly increased by gradually increasing the cam diameter in one direction (sections between a first rotational phase R1 and a second rotational phase R2 and between a third rotational phase R3 and a fourth rotational phase R4 shown in FIG. 4). The cam surface of the cam 530 is also provided with retention sections, in which the cam diameter is constant and the displacement amount of the control shaft 340 is maintained to be unchanged and constant (sections between the second rotational phase R2 and the third rotational phase R3, between the fourth rotational phase R4 and a fifth rotational phase R5, and between the first rotational phase R1 and a reference rotational phase R0 where the roller 540 is in contact with a reference circle 530b of the cam 530 shown in FIG. 4).

In the following description, the direction in which the rotational phase of the cam 530 is changed from the first rotational phase R1, to the second rotational phase R2, to the third rotational phase R3 (the direction in which the cam 530 is rotated rightward (clockwise) in FIG. 4) is defined as the direction in which the rotational phase of the cam 530 is increased. The reference rotational phase R0 is a minimum rotational phase upon variably controlling the rotational phase of the cam 530.

When the rotational phase of the cam 530 is in the section between the reference rotational phase R0 and the first rotational phase R1, the displacement amount of the control shaft 340 is maintained to be "zero". When the rotational phase of the cam 530 is in the section between the second rotational phase R2 and the third rotational phase R3, the displacement amount of the control shaft 340 is maintained to be "L1", which is a constant value. When the rotational phase of the cam 530 is in the section between the fourth rotational phase R4 and the fifth rotational phase R5, the displacement amount of the control shaft 340 is maintained to be "L2", which is a constant value larger than the "L1".

The cam surface of the cam 530 has the above described cam profile. Thus, when the rotational phase of the cam 530 is rotated within a range from the reference rotational phase R0 to the fifth rotational phase R5, the maximum lift amount VL of the intake valve 31 is changed as shown in FIG. 6.

Figure 6:
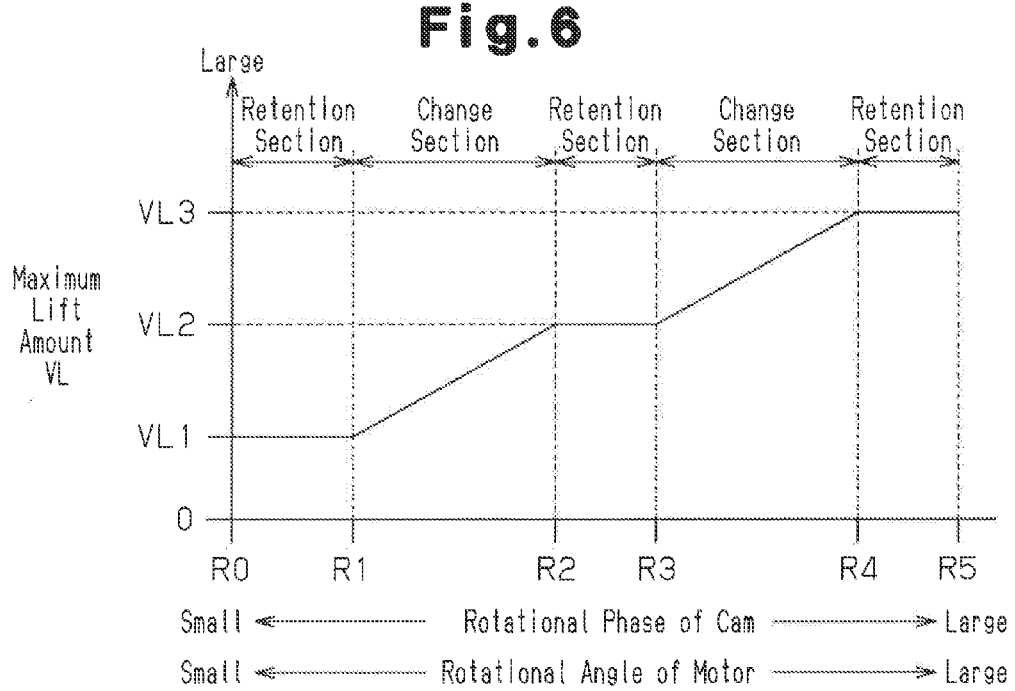
FIG. 6 is a graph showing a variation of a maximum lift amount by the multistage variable valve mechanism.

As shown in FIG. 6, in accordance with an increase in the rotational angle of the motor 210, the rotational phase of the cam 530 is gradually increased. In the section before the first rotational phase R1, where the roller 540 is in contact with the reference circle 530b of the cam 530, the displacement amount of the control shaft 340 is "zero", and the maximum lift amount VL at this time is held to be a first lift amount VL1. The first lift amount VL1 is the minimum value of the maximum lift amount VL. In a process of changing the rotational phase of the cam 530 from the first rotational phase R1 to the second rotational phase R2, the displacement amount of the control shaft 340 is gradually increased. Thus, the maximum lift amount VL is gradually increased from the first lift amount VL1.

When the rotational phase of the cam 530 is in the section between the second rotational phase R2 and the third rotational phase R3, the displacement amount of the control shaft 340 is maintained to be constant "L1". Thus, the maximum lift amount LV at this time is held to be a second lift amount VL2, which is larger than the first lift amount VL1. In a process of changing the rotational phase of the cam 530 from the third rotational phase R3 to the fourth rotational phase R4, the displacement amount of the control shaft 340 is gradually increased. Thus, the maximum lift amount VL is gradually increased from the second lift amount VL2.

When the rotational phase of the cam 530 is in the section between the fourth rotational phase R4 and the fifth rotational phase R5, the displacement amount of the control shaft 340 is maintained to be "L2", which is larger than the "L1". Thus, the maximum lift amount LV at this time is held to be a third lift amount VL3, which is larger than the second lift amount VL2. The third lift amount VL3 is a maximum value of the maximum lift amount VL.

Figure 7:
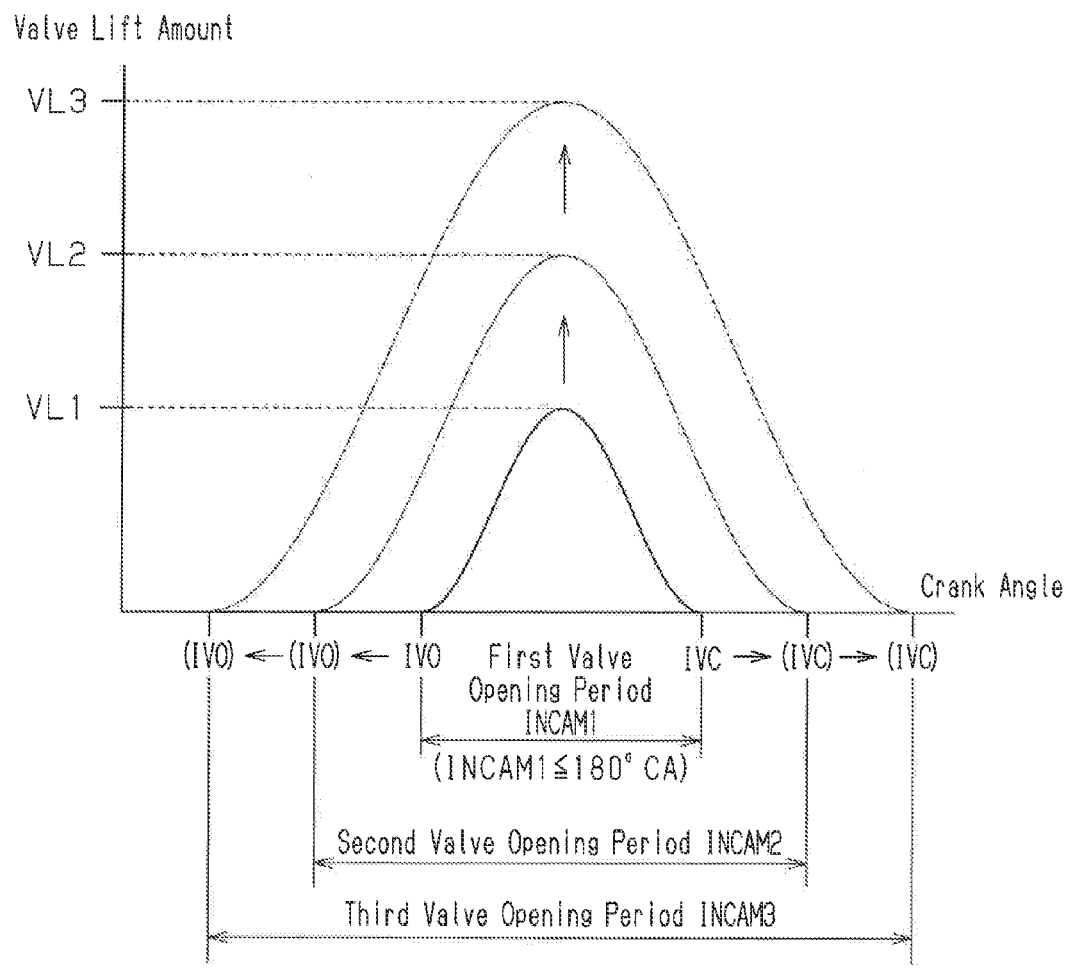
FIG. 7 is a graph showing a variation of valve opening periods by the multistage variable valve mechanism.

As shown in FIG. 7, as the maximum lift amount VL of the intake valve 31 is increased from the first lift amount VL1, the second lift amount VL2, to the third lift amount VL3 in order. A valve opening time IVO of the intake valve 31 is changed in the advancing direction and a valve closing time IVC is changed in the retarding direction, so that the valve opening period INCAM is extended. A first valve opening period INCAM1, which is a valve opening period when the maximum lift amount VL is set to be the first lift amount VL1, is set to 180° CA. The first valve opening period INCAM1 may be changed as necessary as long as the period is not more than 180° CA. A second valve opening period INCAM2, which is a valve opening period when the maximum lift amount VL is set to be the second lift amount VL2, is set to be a period longer than 180° CA. A third valve opening period INCAM3, which is a valve opening period when the maximum lift amount VL is set to be the third lift amount VL3, is set to be a period longer than the second valve opening period INCAM2.

In the variable valve mechanism 600, as the target lift amount VLp of the intake valve 31, one of the first lift amount VL1, the second lift amount VL2, and the third lift amount VL3 described above is selected in correspondence to the engine operation state. By holding the selected maximum lift amount, the maximum lift amount VL of the intake valve 31 is changed in three stages in correspondence to the engine operation state. In this manner, the variable valve mechanism 600 is utilized as a multistage variable valve mechanism for changing the valve characteristic in multiple stages by selecting any valve characteristic from a plurality of valve characteristics set in advance.

Next, a series of processing performed by the motor controller 150 at the time of returning from the cylinder deactivation mode will be described.

Figure 8:
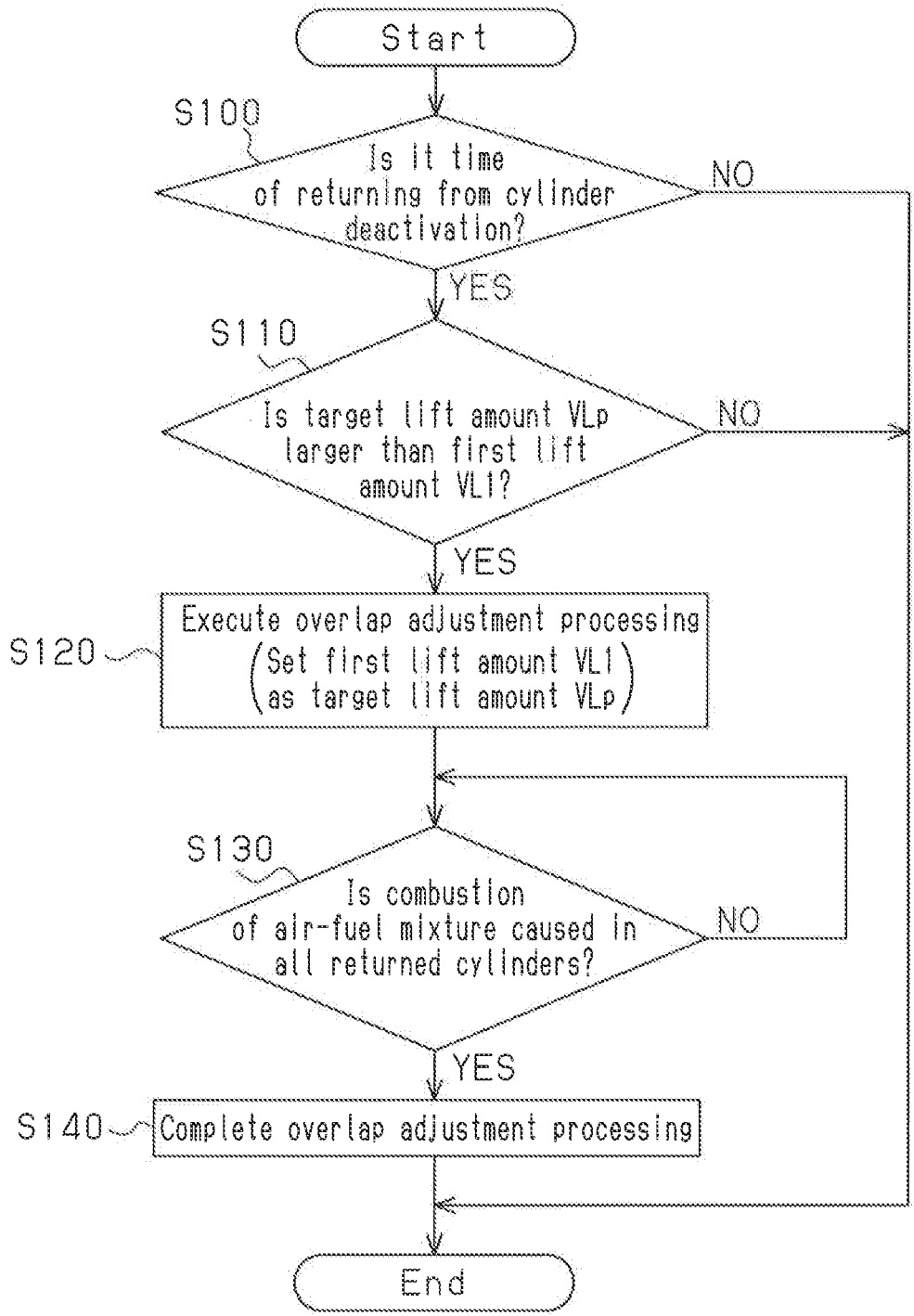
FIG. 8 is a flowchart showing a series of processing procedures at the time of returning from a cylinder deactivation mode in the same embodiment.

As shown in FIG. 8, when this series of processing is started, the motor controller 150 determines whether it is the time for returning from the cylinder deactivation mode to the all-cylinder operation mode, that is, whether it is the time for starting the activation of the second cylinder #2 and the third cylinder #3, which are the deactivated cylinders (S100). Determination of this processing in Step S100 can be positive when a switching condition from the cylinder deactivation mode to the all-cylinder operation mode is satisfied, for example, by a change in an engine load or the like, or when a control signal for bringing the valve stopping mechanisms 28 from an activated state to a non-activated state is output from the engine controller 100.

When the determination is positive in Step S100, the engine controller 100 changes the valve stopping mechanisms 28 into the non-activated state and starts the fuel injection and the ignition of air-fuel mixture in the returned cylinders, which have returned from the cylinder deactivation mode (that is, the second cylinder #2 and the third cylinder #3).

When it is determined that it is not the time for returning from the cylinder deactivation mode in Step S100 (S100: NO), that is, when the all-cylinder operation mode is being executed or the cylinder deactivation mode is being continued, the motor controller 150 temporarily suspends the present processing.

When it is the time for returning from the cylinder deactivation mode (S100: YES), the motor controller 150 determines whether the target lift amount VLp set based on the current required engine output is larger than the first lift amount VL1 (S110). When the target lift amount VLp is not larger than the first lift amount VL1 (S110: NO), that is, when the first lift amount VL1 is set as the target lift amount VLp, the motor controller 150 temporarily suspends the present processing.

When the target lift amount VLp is larger than the first lift amount VL1 (S110: YES), that is, when the second lift amount VL2 or the third lift amount VL3 is set as the target lift amount VLp, the motor controller 150 executes overlap adjustment processing (S120). During execution of the overlap adjustment processing, the first lift amount VL1 is set as the target lift amount VLp, and the rotational phase of the cam 530 is adjusted such that the actual maximum lift amount VL becomes the first lift amount VL1.

Next, the motor controller 150 determines whether the combustion of air-fuel mixture has occurred in all the cylinders that have returned from the cylinder deactivation mode, that is, the second cylinder #2 and the third cylinder #3 (S130). In Step S130, the determination is positive when a signal indicating that the combustion of air-fuel mixture has occurred in all the cylinders that have returned from the cylinder deactivation mode is output from the engine controller 100.

Combustion determination of air-fuel mixture by the engine controller 100 can be performed as necessary.

For example, when the combustion of air-fuel mixture is started in the returned cylinders, which have returned from the cylinder deactivation mode (that is, the second cylinder #2 and the third cylinder #3), output torque is generated. Thus, torque fluctuation in the returned cylinders is increased in comparison to the cylinders during the cylinder deactivation mode. Therefore, the torque fluctuation in the second cylinder #2 and the third cylinder #3 is calculated based on the engine rotational speed or the like, and when the calculated value exceeds a predetermined threshold value, it can be determined that the combustion of air-fuel mixture has occurred. Also, when the combustion of air-fuel mixture is started in the returned cylinders, which have returned from the cylinder deactivation mode, engine vibration is generated in combustion strokes. In a case where such generation of the engine vibration is detected by a knocking sensor or the like, it can be determined that the combustion of air-fuel mixture has occurred. In general, in a little while after returning from the cylinder deactivation mode, the combustion of air-fuel mixture is started in the returned cylinders. Thus, when elapsed time after returning from the cylinder deactivation mode exceeds a predetermined threshold value, it can also be determined that the combustion of air-fuel mixture has occurred in the returned cylinders.

When the determination is negative in Step S130 (S130: NO), that is, when air-fuel mixture has not been combusted yet in either of the second cylinder #2 and the third cylinder #3, or when air-fuel mixture has not been combusted yet in any one of the second cylinder #2 and the third cylinder #3, the motor controller 150 repeats the determination of Step S130 until the signal indicating that the combustion of air-fuel mixture has occurred in all the cylinders that have returned from the cylinder deactivation mode is output from the engine controller 100.

When it is determined that the combustion of air-fuel mixture has occurred in all the cylinders that have returned from the cylinder deactivation mode in Step S130 (S130: YES), the motor controller 150 completes the above described overlap adjustment processing (S140), and temporarily suspends the present processing. When the overlap adjustment processing is completed in Step S140, the maximum lift amount of the intake valve 31 is adjusted to be the target lift amount VLp set based on the required engine output at the time.

Next, operations of the present invention will be described with reference to FIGS. 9 and 10.

Figure 9:
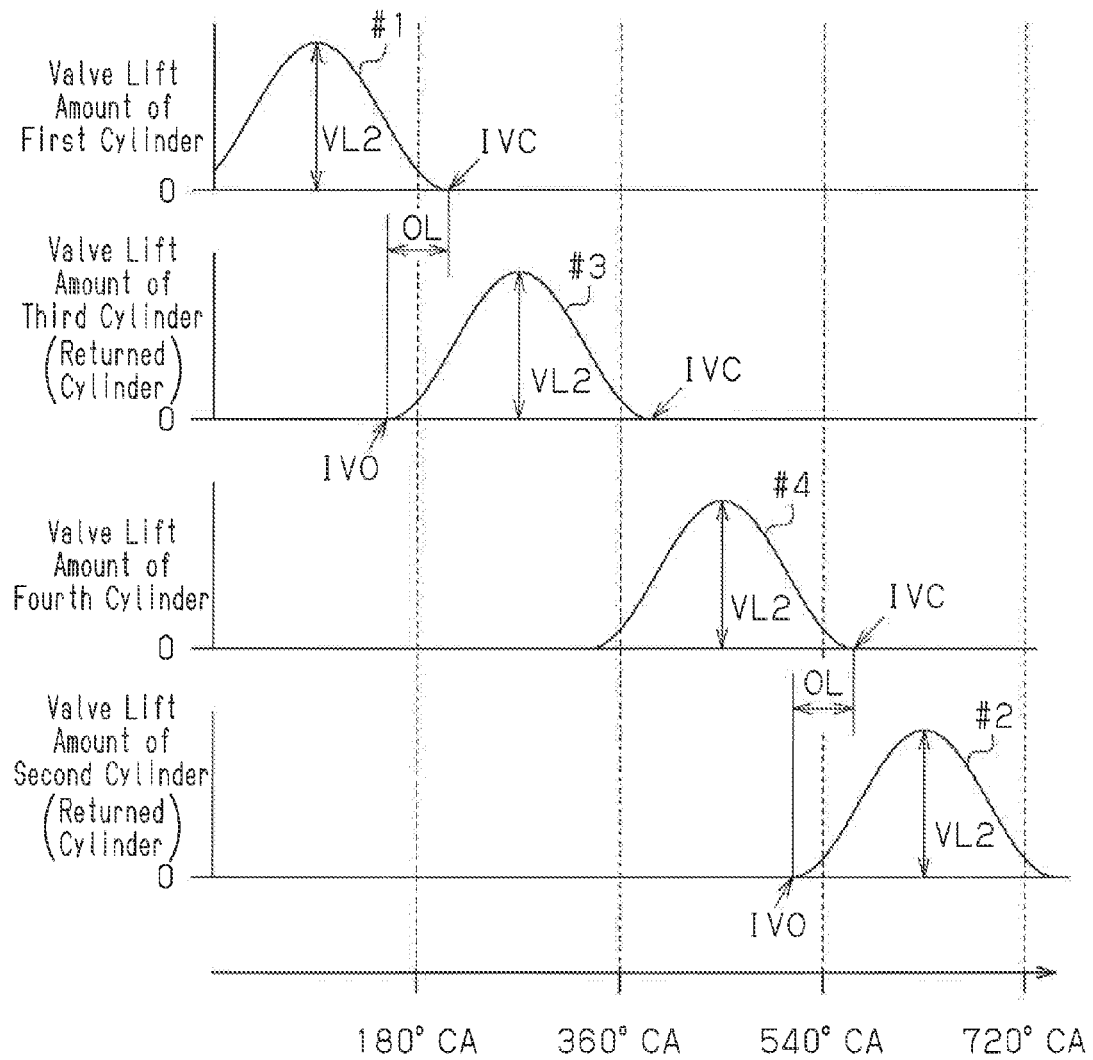
FIG. 9 is a view showing an overlap state of the valve opening periods between cylinders at the time of returning from the cylinder deactivation mode in a case where overlap adjustment processing is not executed.
Figure 10:
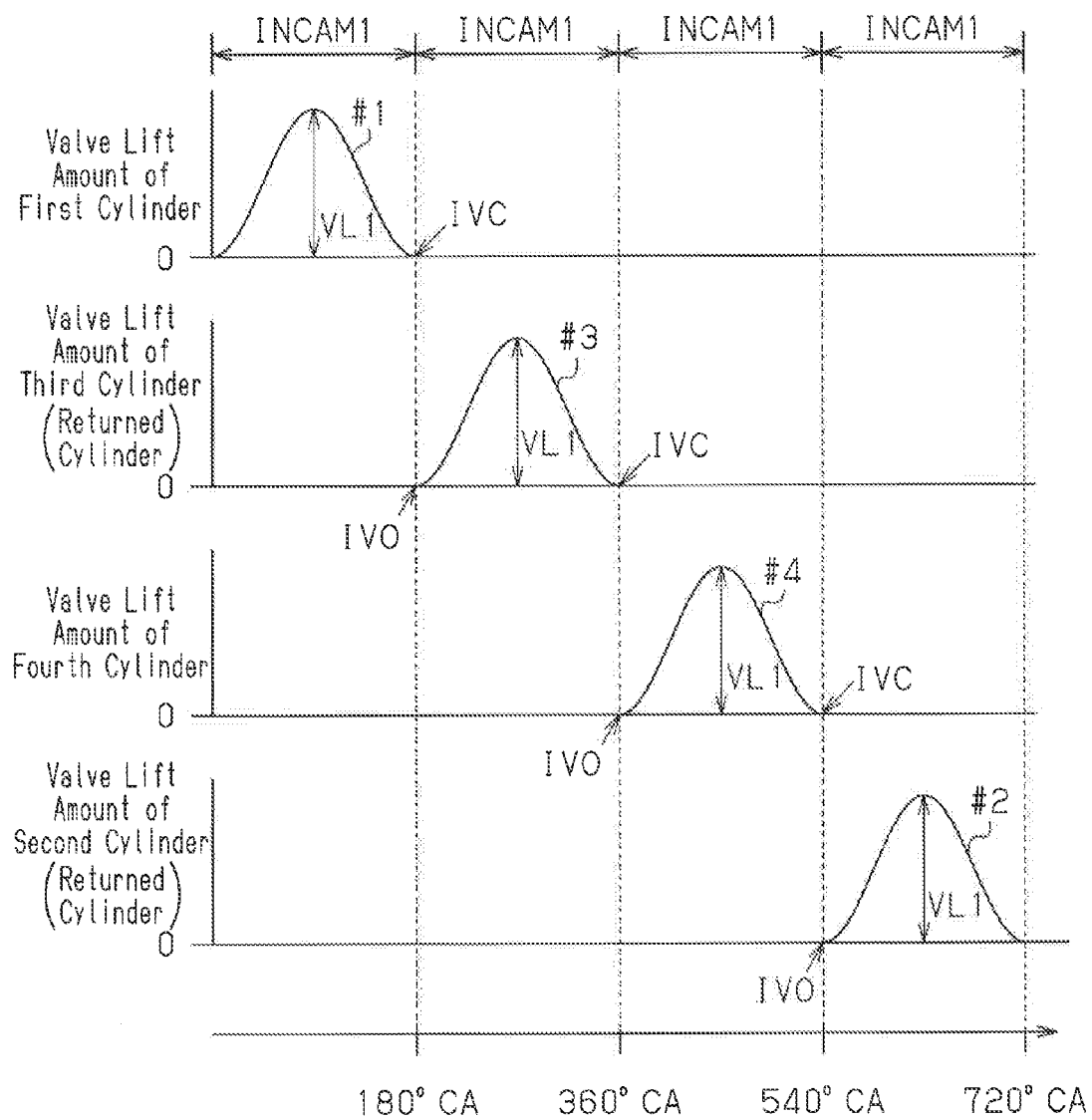
FIG. 10 is a view showing an overlap state of the valve opening periods between the cylinders at the time of returning from the cylinder deactivation mode in the same embodiment.

FIGS. 9 and 10 show the valve opening periods of the intake valves 31 in the cylinders at the time of returning from the cylinder deactivation mode, and overlap states of the valve opening periods of the intake valves 31 between the cylinders. FIG. 9 shows a mode of a case where the series of processing shown in FIG. 8 above is not executed, and FIG. 10 shows a mode of a case where the series of processing shown in FIG. 8 above is executed. FIG. 9 shows an example of a case where the target lift amount VLp set based on the required engine output at the time of returning from the cylinder deactivation mode is the second lift amount VL2.

As shown in FIG. 9, when the all-cylinder operation mode is executed after returning from the cylinder deactivation mode, the opening and closing action of the intake valves 31 of the deactivated cylinders, which have been maintained in the valve closing state (the third cylinder #3 and the second cylinder #2), is started by the second lift amount VL2 in correspondence to the required engine output at the time of returning. As shown in FIG. 7, the second valve opening period INCAM2, which is a valve opening period INCAM of the intake valve 31 when the maximum lift amount VL is set to be the second lift amount VL2, is a period longer than 180° CA. Therefore, the valve opening periods of the intake valves 31 respectively provided in the cylinders are partially overlapped between the cylinders.

That is, part of the valve opening period of the intake valve 31 of the third cylinder #3, which is a returned cylinder in which the opening and closing action of the intake valve 31 is started, and part of the valve opening period of the intake valve 31 of the first cylinder #1, which is an activated cylinder in which the opening and closing action of the intake valve 31 is performed even during execution of the cylinder deactivation mode, are overlapped. In more detail, before the intake valve 31 of the first cylinder #1 is closed, the intake valve 31 of the third cylinder #3 is opened. Thus, in a period from the valve opening time IVO of the intake valve 31 of the third cylinder #3 to the valve closing time IVC of the intake valve 31 of the first cylinder #1, both the intake valves 31 are opened, and an overlap amount OL is generated in the valve opening periods of the intake valves 31.

Similarly, part of the valve opening period of the intake valve 31 of the second cylinder #2, which is a returned cylinder in which the opening and closing action of the intake valve 31 is started, and part of the valve opening period of the intake valve 31 of the fourth cylinder #4, which is an activated cylinder in which the opening and closing action of the intake valve 31 is performed even during the execution of the cylinder deactivation mode, are overlapped. In more detail, before the intake valve 31 of the fourth cylinder #4 is closed, the intake valve 31 of the second cylinder #2 is opened. Thus, in a period from the valve opening time IVO of the intake valve 31 of the second cylinder #2 to the valve closing time IVC of the intake valve 31 of the fourth cylinder #4, both the intake valves 31 are opened, and the overlap amount OL is also generated in the valve opening periods of the intake valves 31.

In the above described manner, in a case where overlap is generated in the valve opening periods of the intake valves 31 between the first cylinder #1 and the third cylinder #3, part of the intake air flowing into the first cylinder #1, which is activated even during the cylinder deactivation mode, also flows into the third cylinder #3, which is a returned cylinder. Therefore, the intake air flowing into the first cylinder #1 is reduced, and the output torque of the first cylinder #1 is decreased. Although part of the intake air flows into the third cylinder #3, the output torque is not generated from the third cylinder #3 after returning from the cylinder deactivation mode and before the combustion of air-fuel mixture is started. Therefore, immediately after returning from the cylinder deactivation mode and before generation of the output torque from the third cylinder #3, the output torque of the engine 1 may be decreased and the torque fluctuation may be generated.

Similarly, in a case where the overlap is generated in the valve opening periods of the intake valves 31 between the fourth cylinder #4 and the second cylinder #2, some of the intake air flowing into the fourth cylinder #4, which is activated even during the cylinder deactivation mode, also flows into the second cylinder #2, which is a returned cylinder. Therefore, the intake air flowing into the fourth cylinder #4 is reduced, and the output torque of the fourth cylinder #4 is decreased. Although some of the intake air flows into the second cylinder #2, the output torque is not generated from the second cylinder #2 after returning from the cylinder deactivation mode and before the combustion of air-fuel mixture is started. Therefore, immediately after returning from the cylinder deactivation mode and before generation of the output torque from the second cylinder #2, the output torque of the engine 1 may be decreased and the torque fluctuation may be generated. FIG. 9 shows an example of a case where the second lift amount VL2 is set as the target lift amount VLp when the all-cylinder operation mode is executed after returning from the cylinder deactivation mode. In a case where the third lift amount VL3 is set as the target lift amount VLp, the valve opening period INCAM of the intake valve 31 is even longer than the second valve opening period INCAM2. Therefore, even in a case where the third lift amount VL3 is set as the target lift amount VLp when the all-cylinder operation mode is executed after returning from the cylinder deactivation mode, the overlap is generated in the valve opening periods of the intake valves 31 between the cylinders, and the torque fluctuation as described above may be generated.

In the present embodiment, even when the target lift amount VLp at the time of returning from the cylinder deactivation mode is the second lift amount VL2 or the third lift amount VL3, the overlap adjustment processing is performed in Step S120 and the target lift amount VLp is set to be the first lift amount VL1 by executing the series of processing shown in FIG. 8. Therefore, at the time of returning from the cylinder deactivation mode, the maximum lift amount VL of the intake valve 31 of the cylinder is set to be the first lift amount VL1 until the overlap adjustment processing is completed in Step S140. As shown in FIG. 7, the first valve opening period INCAM1, which is a valve opening period of the intake valve 31 when the maximum lift amount VL is set to be the first lift amount VL1, is shorter than the second valve opening period INCAM2 when the maximum lift amount VL is set to be the second lift amount VL2. Therefore, the overlap amount in the valve opening periods of the intake valves 31 between the cylinders at the time of returning from the cylinder deactivation mode is smaller than the overlap amount when the valve opening period of the intake valve 31 is set to be the second valve opening period INCAM2, that is, the overlap amount set in the all-cylinder operation mode.

In more detail, as shown in FIG. 10, the first valve opening period INCAM1 is set to 180° CA. In the inline four engine, start timings of an intake stroke in the cylinders are differentiated by 180° CA in the order of ignition. Therefore, as shown in FIG. 10, in a case where the valve opening period INCAM of the intake valve 31 is the first valve opening period INCAM1 set to 180° CA, the valve opening periods INCAM of the intake valves 31 are not overlapped between the activated cylinders activated even during the cylinder deactivation mode and the returned cylinders, which have returned from the cylinder deactivation mode. That is, the valve opening period INCAM of the intake valve 31 of the first cylinder #1, which is an activated cylinder, and the valve opening period INCAM of the intake valve 31 of the third cylinder #3, which is a returned cylinder and enters the intake stroke after the first cylinder #1, are not overlapped. Thus, the above described overlap is not generated. Similarly, the valve opening period INCAM of the intake valve 31 of the fourth cylinder #4, which is an activated cylinder, and the valve opening period INCAM of the intake valve 31 of the second cylinder #2, which is a returned cylinder and enters the intake stroke after the fourth cylinder #4, are not overlapped. Thus, the above described overlap is not generated.

In the above described manner, at the time of returning from the cylinder deactivation mode, the above described overlap is not generated in the valve opening periods INCAM of the intake valves 31 between the cylinders. Therefore, at the time of returning from the cylinder deactivation mode, a reduction in the intake air is effectively suppressed in the cylinders of the first cylinder #1 and the fourth cylinder #4, in which the opening and closing action of the intake valves 31 is performed even during the execution of the cylinder deactivation mode, so that a decrease in the output torque in the first cylinder #1 and the fourth cylinder #4 is suppressed. Thus, the torque fluctuation immediately after returning from the cylinder deactivation mode is properly suppressed.

When the combustion of air-fuel mixture is started in the third cylinder #3 and the second cylinder #2, which have returned from the cylinder deactivation mode, the output torque is also generated from these returned cylinders. By performing the determination processing of Step S130, the motor controller 150 completes execution of the overlap adjustment processing after the combustion of air-fuel mixture is started in the third cylinder #3 and the second cylinder #2, which have returned from the cylinder deactivation mode. Thereby, after the output torque is also generated from the returned third cylinder #3 and the second cylinder #2, the execution of the overlap adjustment processing is completed. Thus, re-generation of the torque fluctuation due to completion of the execution of the overlap adjustment processing is suppressed.

The variable valve mechanism 600 is configured as a multistage variable valve mechanism for changing the valve characteristic in multiple stages. In such a multistage variable valve mechanism, unlike a continuous variable valve mechanism capable of continuously changing the valve characteristic, the valve characteristic cannot be finely adjusted. Therefore, at the time of returning from the cylinder deactivation mode, the above described overlap is easily generated in the valve opening periods of the intake valves 31 between the cylinders. Thus, the valve characteristic at the time of executing the overlap adjustment processing is set as one of three valve characteristics set in advance in the variable valve mechanism 600. That is, the first valve opening period INCAM1, with which the valve opening periods of the intake valves 31 are not overlapped between the cylinders, is set. Therefore, even in the multistage type variable valve mechanism 600 incapable of finely adjusting the valve characteristic, the torque fluctuation immediately after returning from the cylinder deactivation mode is suppressed by executing the overlap adjustment processing.

In the engine 1, which includes the turbocharger 70, a supercharging pressure at the time of executing the cylinder deactivation mode is ensured by the exhaust pressure of the activated cylinders (the first cylinder #1 and the fourth cylinder #4), in which the opening and closing action of the intake valves 31 is performed even during the execution of the cylinder deactivation mode. Therefore, when the reduction in the intake air to the activated cylinders is generated immediately after returning from the cylinder deactivation mode, the exhaust pressure of the activated cylinders is decreased and the supercharging pressure is also decreased. Thus, in the engine 1, which includes the turbocharger 70, in comparison to an engine including no turbocharger 70, the decrease amount of the output torque when the intake air to the activated cylinders is reduced is further increased, so that the above described torque fluctuation also becomes significant. In this respect, in the present embodiment, the reduction in the intake air to the activated cylinders immediately after returning from the cylinder deactivation mode is suppressed by performing the above described overlap adjustment processing. Therefore, the generation of the torque fluctuation due to a decrease in the supercharging pressure immediately after returning from the cylinder deactivation mode is suppressed.

In the engine 1, the external EGR is returned into the cylinders. At the time of returning from the cylinder deactivation mode, when some of the intake air flowing into the activated cylinders (the first cylinder #1 and the fourth cylinder #4) also flows into the returned cylinders (the third cylinder #3 and the second cylinder #2), which have returned from the cylinder deactivation mode, some of the external EGR flowing into the activated cylinders also flows into the returned cylinders. Therefore, the external EGR amount flowing into the activated cylinders is changed and a combustion state of the activated cylinders is changed, so that the torque fluctuation may also be generated. In this respect, in the present embodiment, the reduction in the intake air to the activated cylinders immediately after returning from the cylinder deactivation mode is suppressed by performing the above described overlap adjustment processing. Thus, a change in the external EGR amount flowing into the activated cylinders is also suppressed. Therefore, at the time of returning from the cylinder deactivation mode, the generation of the torque fluctuation due to the change in the external EGR amount flowing into the activated cylinders is also suppressed.

As described above, the present embodiment achieves the following advantages.

(1) At the time of returning from the cylinder deactivation mode, the overlap adjustment processing is executed for controlling the valve characteristic such that the overlap amount in the valve opening periods of the intake valves 31 between the cylinders becomes smaller than the overlap amount set in the all-cylinder operation mode. Therefore, the torque fluctuation immediately after returning from the cylinder deactivation mode is properly suppressed.

(2) The valve characteristic with which the valve opening periods of the intake valves 31 are not overlapped between the cylinders is set as the valve characteristic of the intake valves 31 at the time of executing the overlap adjustment processing. Therefore, the torque fluctuation immediately after returning from the cylinder deactivation mode is more properly suppressed.

(3) After the combustion of air-fuel mixture is started in the cylinders that have returned from the cylinder deactivation mode, the execution of the overlap adjustment processing is completed. Therefore, the re-generation of the torque fluctuation due to the completion of the execution of the overlap adjustment processing is suppressed.

(4) In the multistage type variable valve mechanism 600, the valve characteristic at the time of executing the overlap adjustment processing is set as one of the valve characteristics set in advance. Therefore, even in the multistage type variable valve mechanism 600, which is incapable of finely adjusting the valve characteristic, the torque fluctuation immediately after returning from the cylinder deactivation mode is suppressed by executing the overlap adjustment processing.

(5) The overlap adjustment processing is executed in the engine 1 including the turbocharger 70. Therefore, the generation of the torque fluctuation due to the decrease in the supercharging pressure immediately after returning from the cylinder deactivation mode is suppressed.

(6) The overlap adjustment processing is executed in the engine 1 including the EGR passage 450 for returning some of the exhaust gas to the intake air. Therefore, immediately after returning from the cylinder deactivation mode, the generation of the torque fluctuation due to the change in the external EGR amount flowing into the cylinders is suppressed.

The above described embodiment may be modified as follows.

In Step S130, it is determined whether the combustion of air-fuel mixture has occurred in all the cylinders that have returned from the cylinder deactivation mode. In addition, it may be determined whether the combustion of air-fuel mixture has occurred in some of the cylinders that have returned from the cylinder deactivation mode. That is, in a case of the above described embodiment, it may be determined whether the combustion of air-fuel mixture has occurred in one of the second cylinder #2 and the third cylinder #3, which have returned from the cylinder deactivation mode. Even in this modification, the re-generation of the torque fluctuation due to the completion of the execution of the overlap adjustment processing is suppressed to some extent.

At the time of returning from the cylinder deactivation mode, the valve characteristic is controlled such that the valve opening periods INCAM of the intake valves 31 are not overlapped between all the cylinders. In addition, at the time of returning from the cylinder deactivation mode, the valve characteristic may be controlled such that the valve opening periods INCAM of the intake valves 31 are not overlapped between some of the cylinders. For example, in a case of the above described embodiment, at the time of returning from the cylinder deactivation mode, the valve characteristic may be controlled such that the valve opening periods INCAM of the intake valves 31 are not overlapped only for the first cylinder #1 and the third cylinder #3. In this modification, the first valve opening period INCAM1 is set only for the first cylinder #1 and the third cylinder #3. Similarly, at the time of returning from the cylinder deactivation mode, the valve characteristic may be controlled such that the valve opening periods INCAM of the intake valves 31 are not overlapped only for the fourth cylinder #4 and the second cylinder #2. In this modification, the first valve opening period INCAM1 is set only for the fourth cylinder #4 and the second cylinder #2.

In the above described embodiment, in a case where the overlap adjustment processing is executed, the valve opening periods INCAM of the intake valves 31 of the cylinders are adjusted such that the valve opening periods INCAM of the intake valves 31 are not overlapped between the cylinders. However, in a case where the overlap adjustment processing is executed, the valve opening periods INCAM of the intake valves 31 between the cylinders do not necessarily need to be overlapped. At least in a case where the overlap adjustment processing is executed, the valve opening periods INCAM may be adjusted such that the overlap amount in the valve opening periods INCAM of the intake valves 31 between the cylinders becomes small in comparison to a case of not executing.

For example, a period longer than 180° CA and shorter than the second valve opening period INCAM2 may be set as the first valve opening period INCAM1. Even in a case of this modification, by executing the overlap adjustment processing when the target lift amount VLp is larger than the first lift amount VL1 (S110: YES), that is, when the second lift amount VL2 or the third lift amount VL3 is set as the target lift amount VLp in Step S110, the target lift amount VLp of the intake valve 31 is set to the first lift amount VL1. Therefore, the valve opening period INCAM of the intake valve 31 at the time of returning from the cylinder deactivation mode is set to the first valve opening period INCAM1 which is shorter than the third valve opening period INCAM3 or the second valve opening period INCAM2. Thus, in comparison to a case where the third valve opening period INCAM3 or the second valve opening period INCAM2 is set as the valve opening period INCAM of the intake valve 31, the overlap amount OL of the intake valves 31 between the cylinders is small.

In the above described manner, in a case where the valve characteristic with which the overlap is generated in the valve opening periods INCAM of the intake valves 31 between the cylinders can be set as the valve characteristic of the intake valves 31 at the time of executing the all-cylinder operation mode, the overlap adjustment processing for controlling the valve characteristic is executed such that the overlap amount OL in the valve opening periods INCAM of the intake valves 31 between the cylinders becomes smaller than the overlap amount OL set in the all-cylinder operation mode. In other words, in a case where the second valve opening period INCAM2 or the valve opening period INCAM longer than the second valve opening period INCAM2 can be set at the time of returning from the cylinder deactivation mode, that is, at the time of switching to the all-cylinder operation mode, the overlap adjustment processing for controlling the valve characteristic is executed such that the overlap amount OL becomes smaller than the overlap amount OL set in the all-cylinder operation mode. By such execution of the overlap adjustment processing, the overlap amount OL in the valve opening periods INCAM of the intake valves 31 between the cylinders immediately after returning from the cylinder deactivation mode becomes smaller than the overlap amount OL set in the all-cylinder operation mode. Therefore, at least the advantage described in (1) is achieved.

Figure 11:
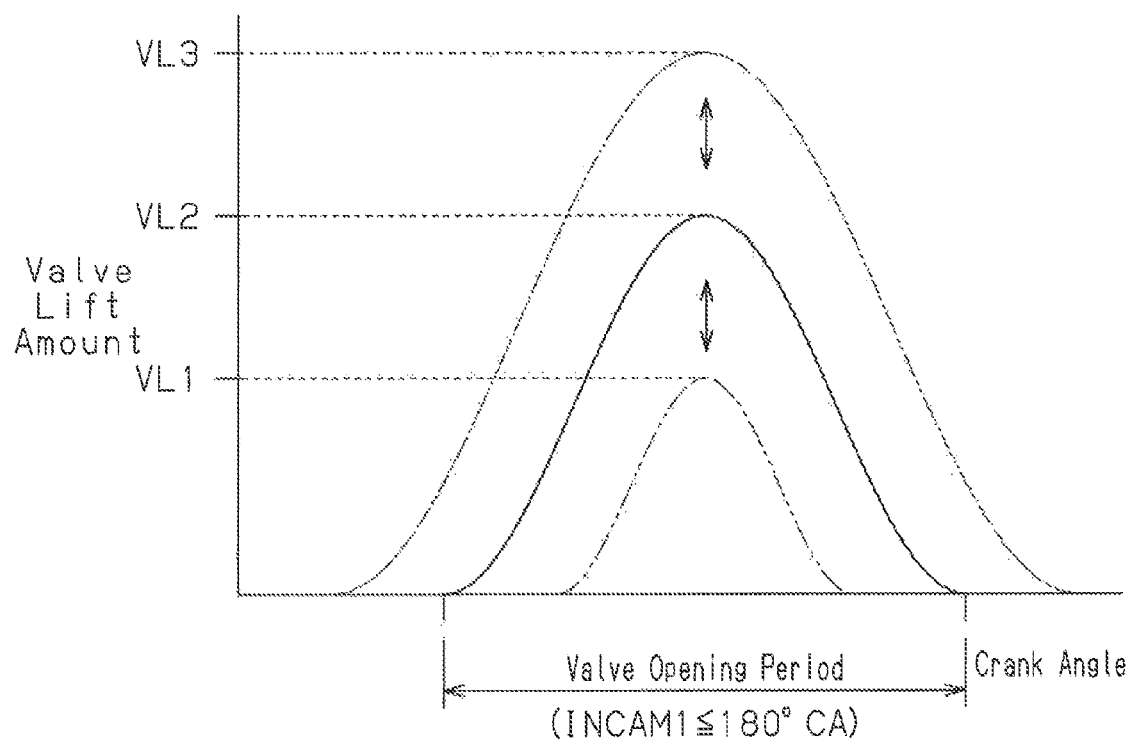
FIG. 11 is a graph showing a modification of the valve opening periods in a modification of the same embodiment.

When the maximum lift amount VL of the intake valve 31 is set to be the first lift amount VL1, the valve opening period INCAM of the intake valve 31 is set to 180° CA. In addition, as shown in FIG. 11, when the maximum lift amount VL of the intake valve 31 is set to be the second lift amount VL2, the valve opening period INCAM of the intake valve 31 may be 180° CA or less. In this case, in Step S110 shown in FIG. 8, it is determined whether the target lift amount VLp is larger than the second lift amount VL2, that is, whether the target lift amount VLp is set to the third lift amount VL3. When the target lift amount VLp is a lift amount not larger than the second lift amount VL2, the series of processing shown in FIG. 8 is once completed. When the target lift amount VLp is larger than the second lift amount VL2, the overlap adjustment processing is executed in Step S120 and the second lift amount VL2 is set as the target lift amount VLp. Even in such a modification, the operations and the advantages corresponding to the above described embodiment can also be obtained.

Although the above described variable valve mechanism 600 is a multistage variable type variable valve mechanism for changing the valve characteristic in a stepwise manner, the variable valve mechanism may be a continuous variable valve mechanism for continuously changing the valve characteristic. For example, by changing the conversion mechanism 500 of the variable valve mechanism 600, the valve characteristic can be continuously changed.

Figure 12:
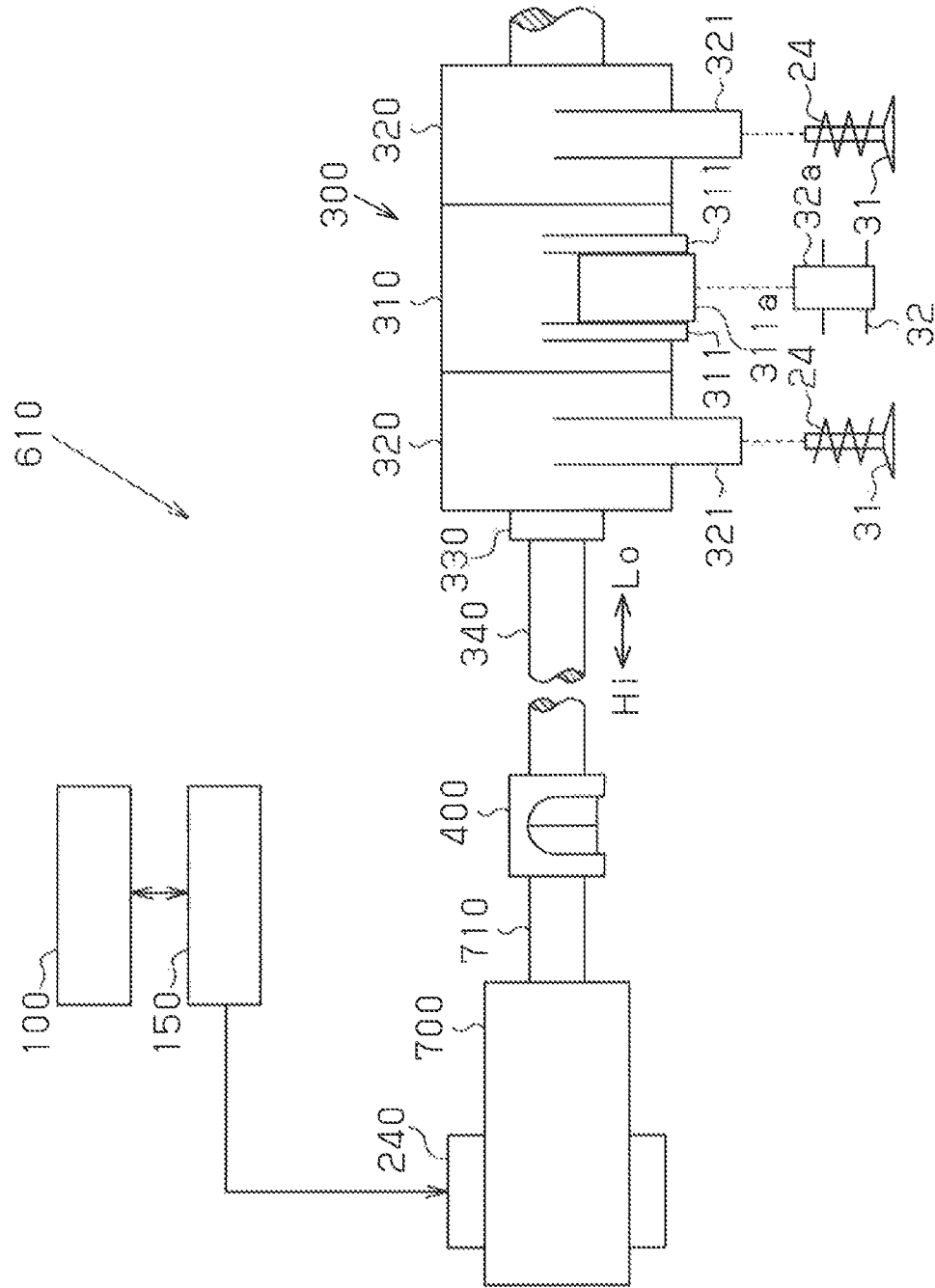
FIG. 12 is a schematic view of a continuous variable valve mechanism in a modification of the same embodiment.

FIG. 12 shows one example of a continuous variable valve mechanism. As shown in FIG. 12, a drive unit of a variable valve mechanism 610 for continuously changing the valve characteristic is provided with a motor 240, and a conversion mechanism 700 for converting rotational speed of the motor 240 into linear motion of an output shaft 710 and outputting the linear motion. A distal end of the control shaft 340 and a distal end of the output shaft 710 are coupled by the coupling member 400. Thereby, when the motor 240 is rotated within a predetermined range, rotation motion of the motor 210 is converted into the linear motion through the conversion mechanism 700 and transmitted to the control shaft 340 via the output shaft 710. The variable mechanism unit 300 is driven by moving the control shaft 340 in the axial direction. The motor 240 is connected to the motor controller 150, and valve characteristics (a maximum lift amount VLA and a valve opening period INCAMA) of the intake valves 31 provided in the cylinders are changed by controlling a rotational angle in correspondence to a drive signal from the motor controller 150.

Figure 13:
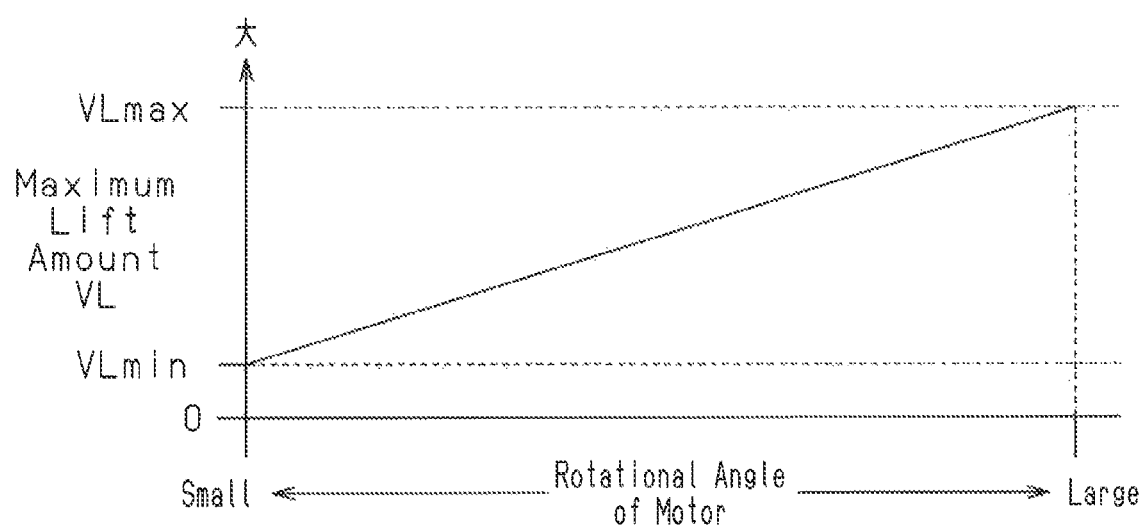
FIG. 13 is a graph showing a modification of a maximum lift amount by the continuous variable valve mechanism.

As shown in FIG. 13, when the variable valve mechanism 610 is activated, the maximum lift amount VL of the intake valve 31 is continuously varied between a minimum value VLmin and a maximum value VLmax in correspondence to the rotational angle of the motor 240.

In a case where such a continuously variable type variable valve mechanism 610 is provided, the advantages excluding (4) are achieved by setting the first lift amount VL1 as the target lift amount VLp such that the valve opening period INCAM of the intake valve 31 becomes the first valve opening period INCAM1 when the overlap adjustment processing is executed in Step S120 shown in FIG. 8.

Upon changing the valve characteristic by the variable mechanism unit 300, the maximum lift amount VL and the valve opening period INCAM of the intake valve 31 are changed in synchronization. Therefore, although a target value of the maximum lift amount VL is set in the above described embodiment, a target value of the valve opening period INCAM may be set.

The maximum lift amount of the intake valve 31 changed by the variable valve mechanism 600 has three stages. In addition, a multistage type variable valve mechanism for changing the maximum lift amount of the intake valve 31 in two stages or four or more stages may be adopted.

In the series of processing shown in FIG. 8, the processing of Step S110 may be omitted. When the determination in Step S100 is positive, the processing starting from Step S120 may be successively performed. Even in this modification, immediately after returning from the cylinder deactivation mode, the valve opening period INCAM of the intake valve 31 of the cylinder is set to be the first valve opening period INCAM1. Thus, the valve opening periods of the intake valves 31 are not overlapped between the cylinders. Therefore, even in this modification, the operations and the advantages corresponding to the above described embodiment are achieved.

The above described shape of the cam 530 is one example, and the cam 530 may have other shapes as long as the control shaft 340 can be moved in the axial direction.

The series of processing shown in FIG. 8 may be performed not by the motor controller 150 but by the engine controller 100.

The turbocharger 70 and the intercooler 35 may be omitted from the engine 1. Even in this case, the advantages excluding (5) are achieved.

The exhaust gas recirculation device (the EGR passage 450, the EGR valve 460, the EGR cooler 470, and the like) may be omitted from the engine 1. Even in this case, the advantages excluding (6) are achieved.

The turbocharger 70, the intercooler 35, and the exhaust gas recirculation device (the EGR passage 450, the EGR valve 460, the EGR cooler 470, and the like) may be omitted from the engine 1. Even in this case, the advantages excluding (5) and (6) are achieved.

Although the valve stopping mechanisms 28 are provided as valve stopping mechanisms for stopping the opening and closing action of the intake valve 31 and the exhaust valve 41, the valve stopping mechanisms may be changed to other mechanisms as necessary. For example, oscillation and oscillation inhibition of the rocker arms may be switched by other mechanisms. For example, regarding the maximum lift amount VL of the intake valve 31 of the cylinder that is deactivated in the cylinder deactivation mode, the variable mechanism unit 300 is formed such that the minimum value thereof becomes "zero". At the time of executing the cylinder deactivation mode, the opening and closing action of the intake valve 31 of the cylinder can be stopped by making the maximum lift amount VL of the intake valve 31 of the cylinder that is deactivated in the cylinder deactivation mode "zero".

The variable mechanism unit 300 is a mechanism capable of changing the maximum lift amount VL and the valve opening period INCAM of the intake valve 31. In addition, the variable mechanism unit may be a mechanism capable of changing only the valve opening period INCAM. The variable mechanism unit 300 is a mechanism for changing the valve opening period INCAM by changing both the valve opening time IVO and the valve closing time IVC of the intake valve 31. However, in addition, the variable mechanism unit may be a mechanism for changing the valve opening period INCAM by changing only the valve opening time IVO of the intake valve 31 or a mechanism for changing the valve opening period INCAM by changing only the valve closing time IVC of the intake valve 31.

The structure of the variable valve mechanism 600 is one example, and the variable valve mechanism may change the valve characteristic in multiple stages with other structures. For example, in a case where a direct-acting type valve system is provided, the valve characteristic can be changed in a stepwise manner by providing a variable valve mechanism for changing an activation amount of a valve lifter activated by a cam in multiple stages. In a case where a rocker arm type valve system is provided, the valve characteristic can be changed in a stepwise manner by providing a variable valve mechanism for changing an oscillation amount of rocker arms by changing a sinking amount of lash adjusters supporting the rocker arms. In a case where a rocker arm type valve system is provided, the valve characteristic can be changed in a stepwise manner by providing a variable valve mechanism for changing the oscillation amount of the rocker arms by changing a shape of the rocker arms in multiple stages.

Figure 14:
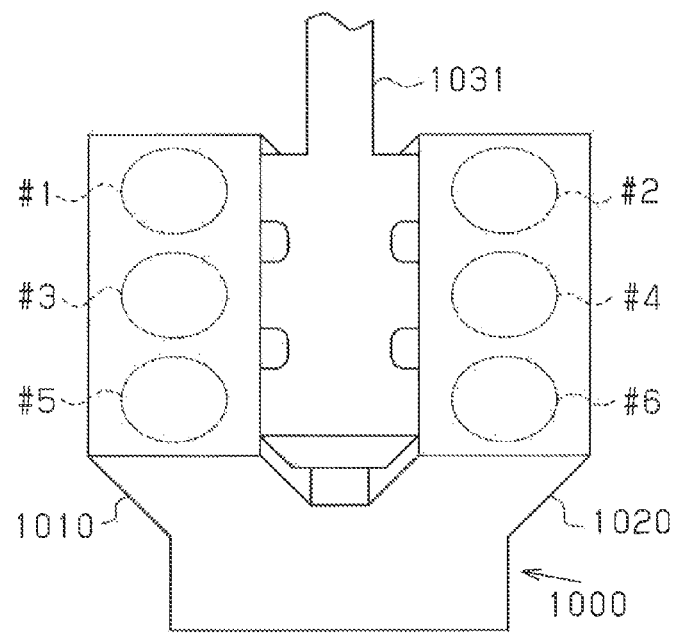
FIG. 14 is a schematic view showing the entire V6 internal combustion engine in a modification of the same embodiment.
Figure 15:
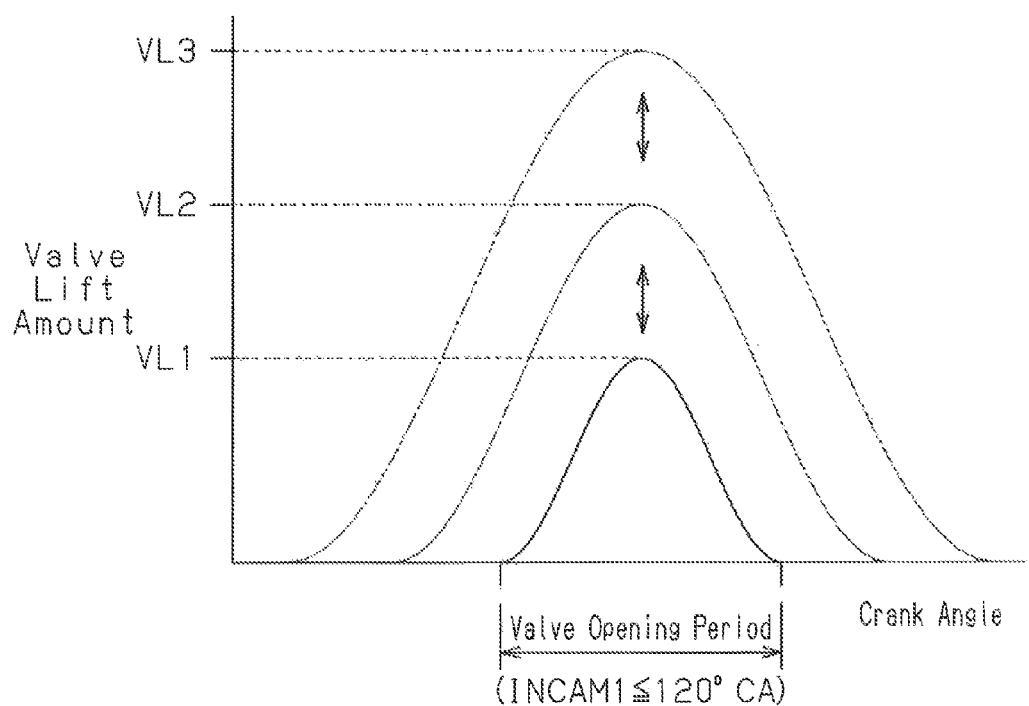
FIG. 15 is a graph showing a variation of the valve opening periods in the V6 internal combustion engine.

The engine 1 is an inline four engine. However, even with an engine having other numbers of cylinders or an engine in which an arrangement pattern of cylinders is different (for example, a V engine, a W engine, a horizontally-opposed engine, a radial engine, and the like), the operations and the advantages corresponding to the above described embodiment are achieved by executing the overlap adjustment processing. FIGS. 14 and 15 show setting examples of the valve opening period INCAM in a case where the overlap adjustment processing is executed in a V6 engine.

As shown in FIG. 14, an engine 1000 is a V6 engine, and a first cylinder #1, a third cylinder #3, and a fifth cylinder #5 are provided in a first bank 1010. A second cylinder #2, a fourth cylinder #4, and a sixth cylinder #6 are provided in a second bank 1020. An intake manifold 1031 for distributing intake air to the cylinders is provided between the first bank 1010 and the second bank 1020. In the engine 1000, the ignition of air-fuel mixture is performed from the first cylinder #1, the second cylinder #2, the third cylinder #3, the fourth cylinder #4, the fifth cylinder #5, to the sixth cylinder #6 in this order. When the cylinder deactivation mode is executed, all the cylinders provided in the second bank 1020 (the second cylinder #2, the fourth cylinder #4, and the sixth cylinder #6) are deactivated in the same manner as the engine 1.

As shown in FIG. 15, the maximum lift amount VL of the intake valve provided in the cylinder is changed in multiple stages in the same manner as the above described embodiment. A first valve opening period INCAM1, which is a valve opening period when the maximum lift amount VL of the variable intake valve is set to be a first lift amount VL1 of a minimum value, is set to 120° CA. The first valve opening period INCAM1 may be changed as necessary as long as the period is not more than 120° CA.

Figure 16:
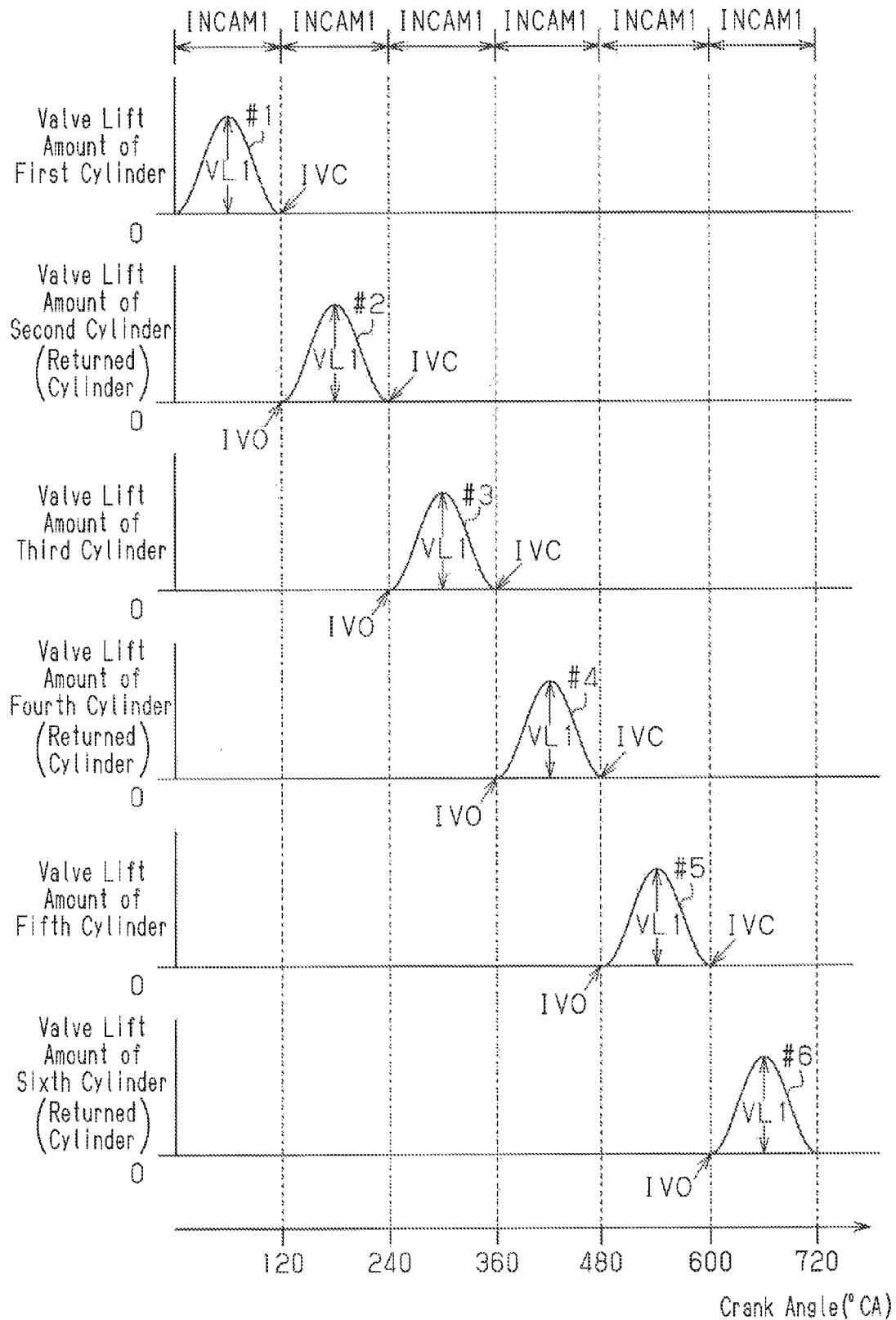
FIG. 16 is a view showing an overlap state of the valve opening periods between the cylinders when the V6 internal combustion engine returns from the cylinder deactivation mode.

As shown in FIG. 16, when returning from the cylinder deactivation mode is performed in the engine 1000, the opening and closing action of the intake valves of the deactivated cylinders (the second cylinder #2, the fourth cylinder #4, and the sixth cylinder #6), which have been maintained in the valve closing state until the returning, is started. As shown in FIG. 15, the first valve opening period INCAM1, which is a valve opening period INCAM of the intake valve when the maximum lift amount VL is set to be the first lift amount VL, is set to 120° CA. Therefore, when the overlap adjustment processing is executed immediately after returning from the cylinder deactivation mode, the valve opening period of the intake valve of the cylinder is set to 120° CA. In the V6 engine, start timings of the intake stroke in the cylinders are differentiated by 120° CA in the order of ignition. Therefore, as shown in FIG. 16, in a case where the valve opening period INCAM of the intake valve is the first valve opening period INCAM1 set to 120° CA, the valve opening periods INCAM of the intake valves are not overlapped between the activated cylinders activated even during the cylinder deactivation mode and the returned cylinders, which have returned from the cylinder deactivation mode. For example, the valve opening period INCAM of the intake valve of the first cylinder #1, which is an activated cylinder, and the valve opening period INCAM of the intake valve of the second cylinder #2, which is a returned cylinder and enters the intake stroke after the first cylinder #1, are not overlapped. Thus, the above described overlap amount OL becomes "zero". Similarly, the valve opening period INCAM of the intake valve of the third cylinder #3, which is an activated cylinder, and the valve opening period INCAM of the intake valve of the fourth cylinder #4, which is a returned cylinder and enters the intake stroke after the third cylinder #3, are not overlapped. Similarly, the valve opening period INCAM of the intake valve of the fifth cylinder #5, which is an activated cylinder, and the valve opening period INCAM of the intake valve of the sixth cylinder #6, which is a returned cylinder and enters the intake stroke after the fifth cylinder #5, are not overlapped.

In the above described manner, at the time of returning from the cylinder deactivation mode, the above described overlap is not generated in the valve opening periods INCAM of the intake valves between the cylinders. Therefore, at the time of returning from the cylinder deactivation mode, the reduction in the intake air is effectively suppressed in the cylinders of the first cylinder #1, the third cylinder #3, and the fifth cylinder #5 in which the opening and closing action of the intake valves is performed even during the execution of the cylinder deactivation mode, so that the decrease in the output torque in the first cylinder #1, the third cylinder #3, and the fifth cylinder #5 is suppressed. Thus, the torque fluctuation immediately after returning from the cylinder deactivation mode is properly suppressed.

Description Of The Reference Numerals

1 . . . Engine, 10 . . . Cylinder block, 11 . . . Cylinder bore, 12 . . . Piston, 13 . . . Combustion chamber, 20 . . . Cylinder head, 21 . . . Intake port, 22 . . . Exhaust port, 24 . . . Valve spring, 25 . . . Lash adjuster, 26 . . . Rocker arm, 26a . . . Roller, 30 . . . Intake passage, 31 . . . Intake valve, 32 . . . Intake camshaft, 32a . . . Intake cam, 33 . . . Throttle valve,

34 . . . Intake manifold, 35 . . . Intercooler, 41 . . . Exhaust valve, 42 . . . Exhaust camshaft, 42*a* . . . Exhaust cam, 45 . . . Exhaust manifold, 46 . . . Exhaust gas passage, 50 . . . Spring, 70 . . . Turbocharger, 71 . . . Compressor housing, 72 . . . Turbine housing, 100 . . . Engine controller, 150 . . . Motor controller, 210 . . . Motor, 211 . . . Rotational angle sensor, 220 . . . Reduction mechanism, 240 . . . Motor, 300 . . . Variable mechanism unit, 310 . . . Input section, 311 . . . Input arm, 311*a* . . . Roller, 312 . . . Helical spline, 313 . . . Projection, 314 . . . Housing, 320 . . . Output section, 321 . . . Output arm, 322 . . . Helical spline, 323 . . . Housing, 330 . . . Support pipe, 340 . . . Control shaft, 350 . . . Slider gear, 351 . . . Helical spline, 352 . . . Helical spline, 400 . . . Coupling member, 450 . . . EGR passage, 460 . . . EGR valve, 470 . . . EGR cooler, 500 . . . Conversion mechanism, 510 . . . Holder, 511 . . . Connection shaft, 520 . . . Guide, 530 . . . Cam, 530*b* . . . Reference circle, 540 . . . Roller, 600, 610 . . . Variable valve mechanism, 700 . . . Conversion mechanism, 710 . . . Output shaft, 1000 . . . Engine, 1010 . . . First bank, 1020 . . . Second bank, 1031 . . . Intake manifold

The invention claimed is:

1. A controller for a variable valve mechanism applied to an internal combustion engine including a plurality of cylinders, intake valves provided respectively in the cylinders, and a variable valve mechanism for changing a valve characteristic of the intake valves, wherein the internal combustion engine is capable of switching an operation mode between a cylinder deactivation mode for retaining the intake valves of some of the cylinders in a valve closing state and an all-cylinder operation mode for performing opening and closing actions of the intake valves of all the cylinders, the controller comprising:
a control section for controlling the valve characteristic, wherein
the control section is capable of setting, as the valve characteristic at the time of executing the all-cylinder operation mode, a valve characteristic with which an overlap is generated in valve opening periods of the intake valves between the cylinders, and
when the internal combustion engine returns from the cylinder deactivation mode, the control section is configured to execute overlap adjustment processing for controlling the valve characteristic such that an overlap amount in the valve opening periods of the intake valves between the cylinders becomes smaller than an overlap amount set in the all-cylinder operation mode.

2. The controller for a variable valve mechanism according to claim 1, wherein the valve characteristic when the overlap adjustment processing is executed is a valve characteristic with which the valve opening periods of the intake valves are not overlapped between the cylinders.

3. The controller for a variable valve mechanism according to claim 1, wherein the control section is configured to complete execution of the overlap adjustment processing after air-fuel mixture is combusted in the cylinders that have returned from the cylinder deactivation mode.

4. The controller for a variable valve mechanism according to claim 1, wherein
the variable valve mechanism is a multistage variable valve mechanism for changing the valve characteristic in multiple stages by selecting a valve characteristic from a plurality of valve characteristics set in advance, and
the valve characteristic at the time of executing the overlap adjustment processing is set as one of the plurality of valve characteristics.

5. The controller for a variable valve mechanism according to claim 4, wherein
the multistage variable valve mechanism includes a variable mechanism unit for changing the valve characteristic of the intake valves, a control shaft for activating the variable mechanism unit, a cam for moving the control shaft in the axial direction, and an electric motor for turning the cam, and
a cam surface of the cam has a section in which an axial displacement amount of the control shaft is changed, and a plurality of sections in which the displacement amount is constant.

6. The controller for a variable valve mechanism according to claim 1, wherein the internal combustion engine includes a forced induction device for supercharging intake air by utilizing exhaust gas.

7. The controller for a variable valve mechanism according to claim 1, wherein the internal combustion engine includes a return passage for returning some of the exhaust gas to the intake air.

\* \* \* \* \*